(12) United States Patent
Terai

(10) Patent No.: US 9,235,339 B2
(45) Date of Patent: Jan. 12, 2016

(54) INFORMATION PROCESSING APPARATUS, INFORMATION PROCESSING METHOD, AND RECORDING MEDIUM

(75) Inventor: Takao Terai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 375 days.

(21) Appl. No.: 13/704,821

(22) PCT Filed: Jun. 27, 2011

(86) PCT No.: PCT/JP2011/003652
§ 371 (c)(1),
(2), (4) Date: Dec. 17, 2012

(87) PCT Pub. No.: WO2012/011226
PCT Pub. Date: Jan. 26, 2012

(65) Prior Publication Data
US 2013/0091472 A1    Apr. 11, 2013

(30) Foreign Application Priority Data

Jul. 22, 2010 (JP) ................................ 2010-165023

(51) Int. Cl.
*G01C 7/00* (2006.01)
*G01C 7/04* (2006.01)
(Continued)

(52) U.S. Cl.
CPC .............. *G06F 3/0487* (2013.01); *G01C 21/20* (2013.01)

(58) Field of Classification Search
CPC ... G06F 17/30241; G06F 15/00; G06F 15/60; G06F 3/04845; G06F 3/048; G06F 3/147; G06F 3/0487; G08G 1/005; G08G 1/123; G08G 1/0962; G08G 1/00; G01C 21/26; G01C 21/00; G01C 21/20; G01C 21/32; G01C 21/36; G01C 21/3697; G01C 7/00; G01C 7/04; G11B 2220/2545; G11B 2220/213; G11B 27/105; G11B 27/322; H04N 5/91; H04N 5/9201; H04N 9/8205; H04N 9/87
USPC ................... 701/200, 201; 340/995.1, 995.18
See application file for complete search history.

(56) References Cited

U.S. PATENT DOCUMENTS 6,906,643 B2 * 6/2005 Samadani et al. ....... 340/995.18
7,149,961 B2 * 12/2006 Harville et al. ............... 715/202
(Continued)

FOREIGN PATENT DOCUMENTS

JP    2003-75173 A      3/2003
JP    2008-14711 A      1/2008
JP    2010-79843 A      4/2010

OTHER PUBLICATIONS

U.S. Appl. No. 13/810,333, filed Jan. 15, 2013, Terai.
(Continued)

*Primary Examiner* — Jerrah Edwards
*Assistant Examiner* — Aaron Smith
(74) *Attorney, Agent, or Firm* — Hazuki International, LLC

(57) ABSTRACT

An information processing apparatus, method, and recording medium which acquire movement trace information and automatically determine a division point for dividing the movement trace information based on an analysis result of the movement trace information. Optionally a movement trace track is generated from the movement trace. Various criteria used for how the division points are generated include using distance and time; altitudes; repeated track; mode of transportation; and lapse of data, for example.

20 Claims, 30 Drawing Sheets

(51) Int. Cl.
*G01C 21/36* (2006.01)
*G01C 21/00* (2006.01)
*G06F 3/147* (2006.01)
*G06F 3/0487* (2013.01)
*G01C 21/20* (2006.01)

(56) References Cited

U.S. PATENT DOCUMENTS 8,204,680 B1 * 6/2012 Dorum .......................... 701/411

2006/0224311 A1 * 10/2006 Watanabe et al. ............. 701/208
2011/0160996 A1  6/2011 Terai et al.

OTHER PUBLICATIONS

U.S. Appl. No. 13/809,952, filed Jan. 14, 2013, Terai.
International Search Report issued Sep. 20, 2011 in PCT/JP2011/003652.

* cited by examiner

INFORMATION PROCESSING APPARATUS, INFORMATION PROCESSING METHOD, AND RECORDING MEDIUM

TECHNICAL FIELD

The present disclosure relates to an information processing apparatus, an information processing method, and a recording medium.

BACKGROUND ART

Currently, a car navigation device for showing a route to a destination based on position information acquired using a GPS (Global Positioning System) and the like is in widespread use. For example, in JP 2010-79843A, there is disclosed a navigation system which records movement trace information and use the movement trace information as reference information of route search in navigation.

On the other hand, there are more and more portable electronic devices such as a mobile phone, a portable game device, a notebook PC (Personal Computer), and a camera, which are each provided with a function of acquiring position information. Accompanied therewith, the position information is becoming to be used in various forms.

SUMMARY

Technical Problem

For example, by causing a movement trace to be displayed in a manner that the movement trace is superimposed on a map and by displaying an icon which moves along the movement trace, there can be considered a new way of utilizing the movement trace that the movement trace is played and is "watched and listened to". However, as recognized by the present inventor, movement trace information is generally a group of data and it is difficult to be handled as it is, and there is a concern that the playback of the movement trace information may produce a monotonous effect.

In light of the foregoing, it is desirable as recognized by the present inventor to provide an information processing apparatus, an information processing method, and a recording medium, which are novel and improved, and which are capable of generating a movement trace track from movement trace information which is divided based on an analysis result of movement trace information.

Solution to Problem

An information processing apparatus according to an embodiment includes a non-transitory computer readable medium have movement trace information stored therein, and a computer processing unit that automatically divides the movement trace information at a division point into a first movement trace segment and a second movement trace segment.

According to the embodiment the computer processing unit is configured to generate a movement trace track from the movement trace information.

Optionally, the apparatus includes an interface through which the computer processing unit outputs a display signal that causes a display device to display the movement trace track that includes the first movement trace segment, the second movement trace segment, and a visual indication of the division point.

The apparatus may also employ the computer processing unit to automatically determine the division point based on position information of a stay part.

According to the embodiment, the stay part includes a plurality of stay positions within a predetermined geographic area over a predetermined time period. Optionally, one of the plurality of stay positions is set when position information of a movement trace track is continuously contained within the predetermined area for an hour or more.

In an embodiment, the computer processing unit automatically determines the division point based on altitude information. Optionally, the altitude information includes time-series altitude changes of the movement trace information, and the computer processing unit determines the division point at a peak altitude within a predetermined time period. The computer processing unit does not necessarily set the division point at a peak altitude when inclination angle information just before and just after the peak altitude is less than a predetermined threshold.

According to an embodiment, the computer processing unit automatically determines the division point based on detection of an orbiting movement in the movement trace information.

Alternatively, the computer processing unit automatically determines the division point based on a change in transportation mode. Optionally, the computer processing unit detects a change in speed of the movement trace information and determines that the transportation mode has changed when the change in speed is above a predetermined level.

In an embodiment, the computer processing unit automatically determines the division point based on content data associated in time with a position in the movement trace information. Optionally, the content data includes at least one of a photograph, a video recording, and an audio recording.

In an embodiment, the computer processing unit automatically determines the division point based on a lapse of position data.

In another embodiment, the computer processing unit automatically determines the division point based on at least one of time of day and day of week.

The apparatus may provide the display signal for producing the movement trace track information for display on a playback screen of the display device.

In an embodiment, the computer processing unit automatically determines the division point based on predefined user settable track segments.

In an information processing method, the method includes retrieving from a non-transitory computer readable medium movement trace information, and automatically dividing with a computer processing unit the movement trace information at a division point into a first movement trace segment and a second movement trace segment.

In a non-transitory computer readable storage device, the device includes instructions that when executed by a computer processing unit performs an information processing method that includes retrieving from the non-transitory computer readable medium movement trace information, and automatically dividing with the computer processing unit the movement trace information into a first movement trace segment and a second movement trace segment at a division point.

According to another embodiment of the present disclosure, there is provided a program for causing a computer to function as an information processing apparatus which includes a movement trace information-acquisition section which acquires movement trace information including position information and time information corresponding to the position information, a division point-determination section which determines a division point for dividing the movement trace information based on an analysis result of the movement trace information, and a track generation section which generates a movement trace track from the movement trace information based on the division point.

Advantageous Effects of Invention

According to the embodiments of the present disclosure described above, it becomes possible to generate a movement trace track from the movement trace information which is divided based on the analysis result of the movement trace information.

DESCRIPTION OF EMBODIMENTS

Figure 1:
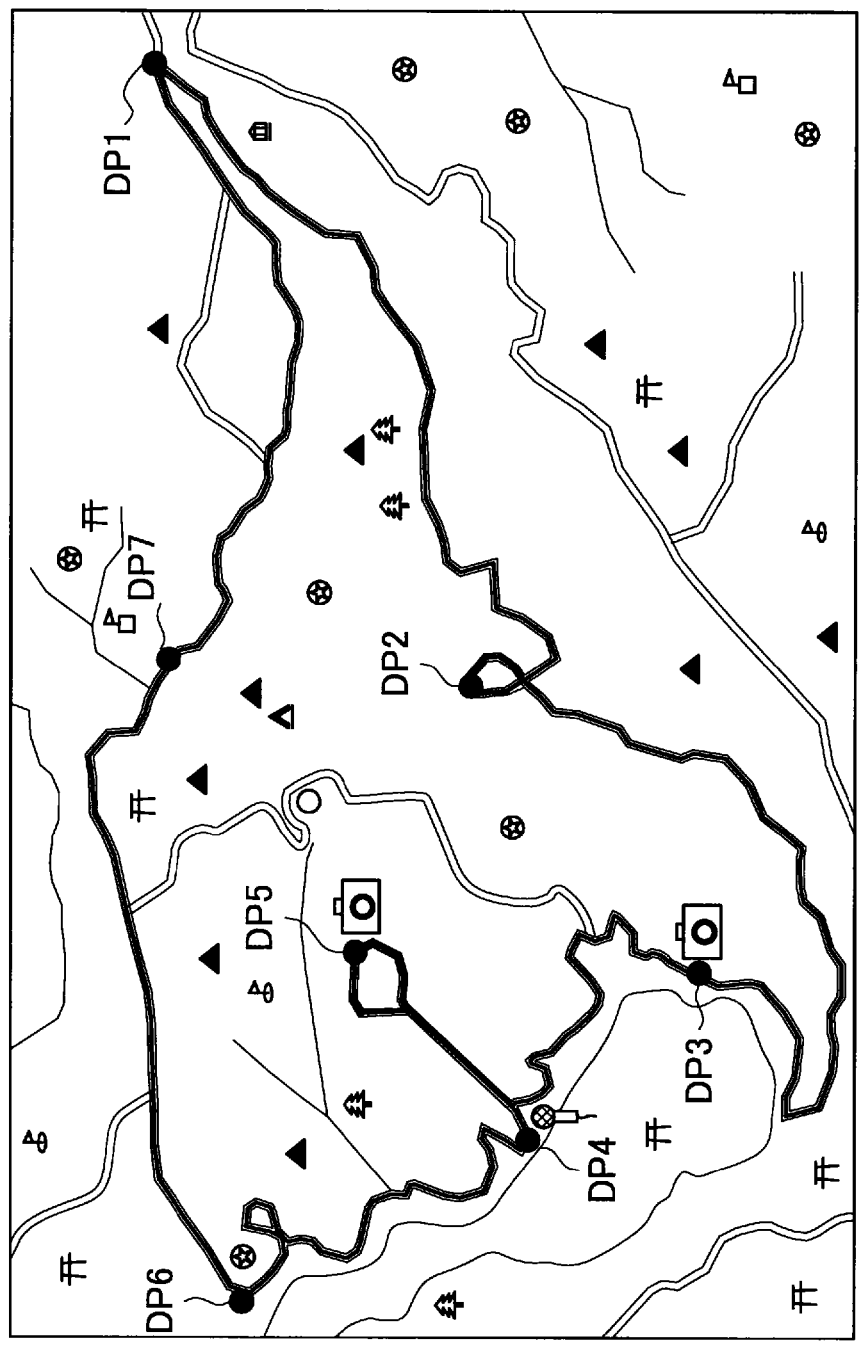
FIG. 1 is an explanatory diagram showing an example of movement trace information.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.
1. Outline
2. First embodiment (PND)
2-1. Navigation function unit (generation of movement trace information)
2-2. Division of movement trace information
2-3. Generation of track
2-4. Generation of track list
2-5. Playback of track
3. Second embodiment (playback device)
4. Third embodiment (imaging device)

1. Outline

Figure 29:
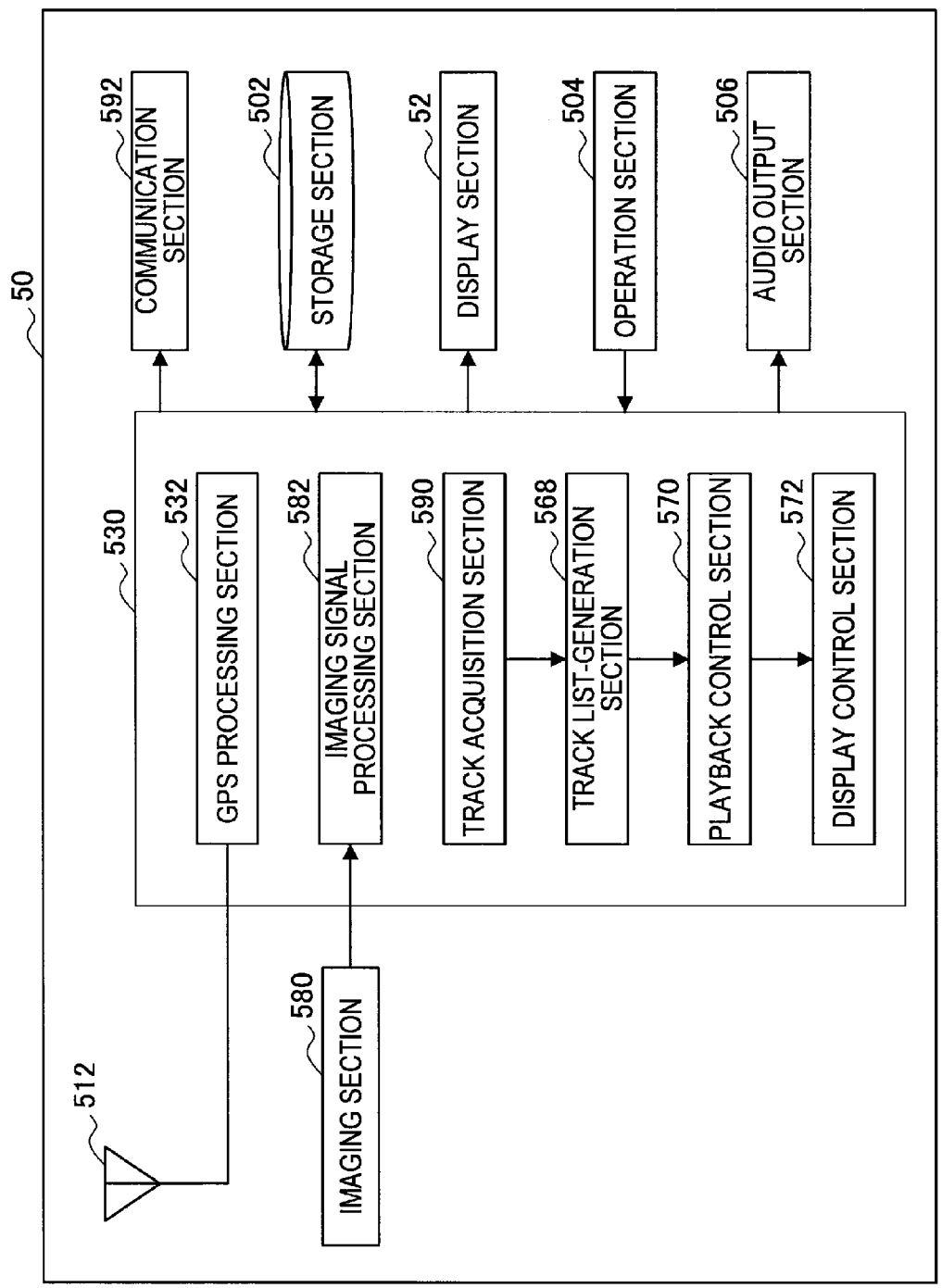
FIG. 29 is a block diagram showing a functional configuration of an information processing apparatus (imaging device) according to a third embodiment.
Figure 30:
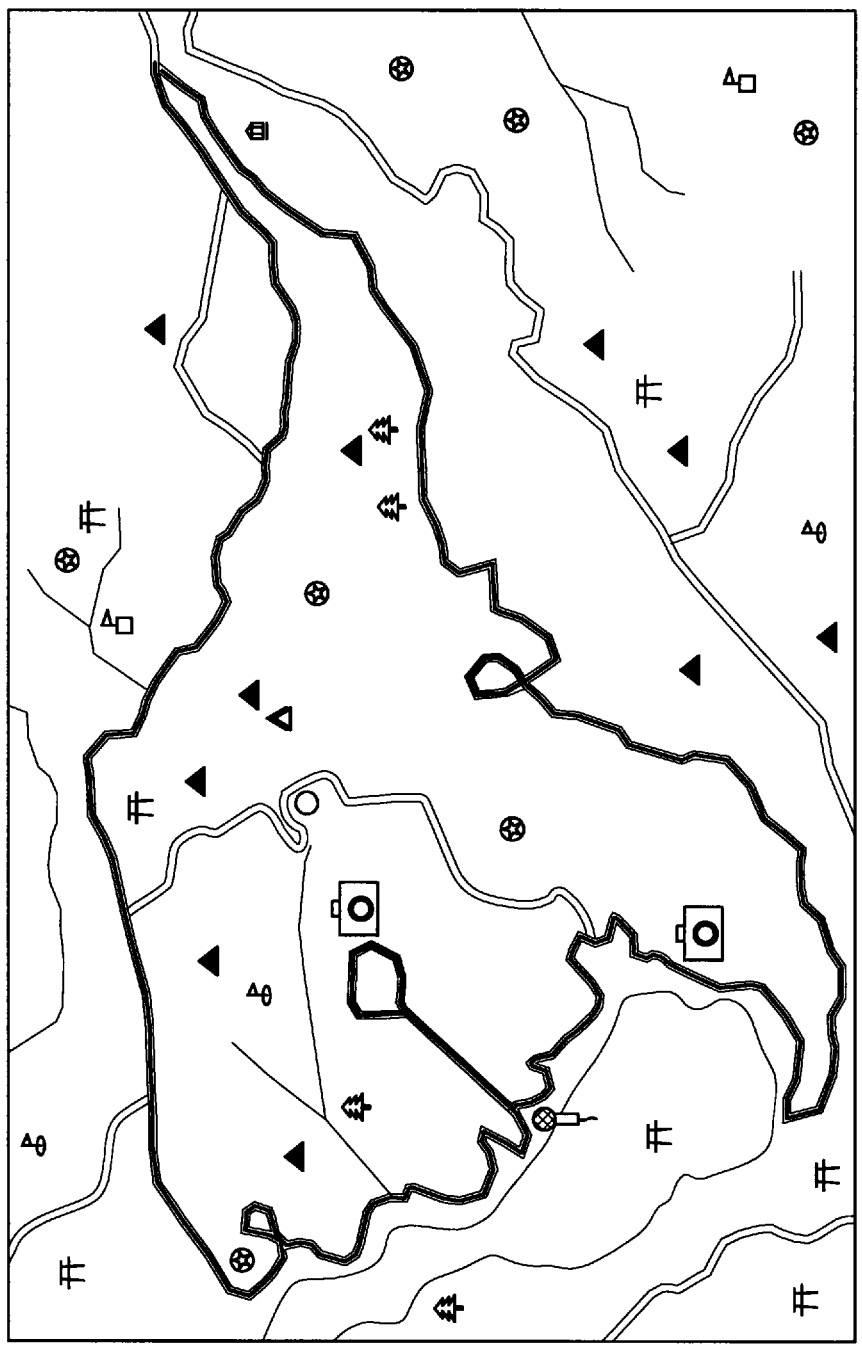
FIG. 30 is an explanatory diagram showing an example of a movement trace superimposed on a map.
Figure 31:
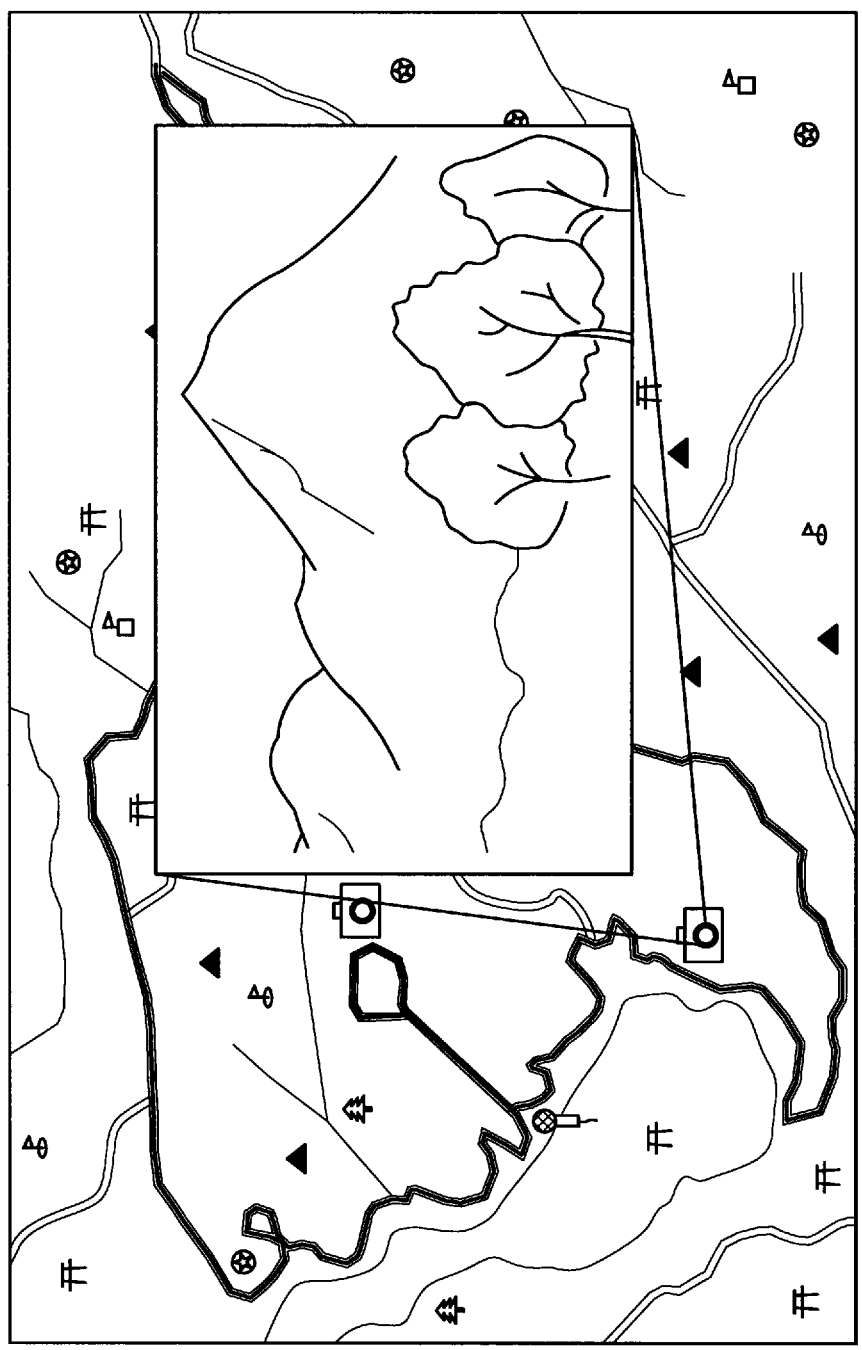
FIG. 31 is an explanatory diagram showing an example of playback of photograph data whose link is provided on a map.
Figure 32:
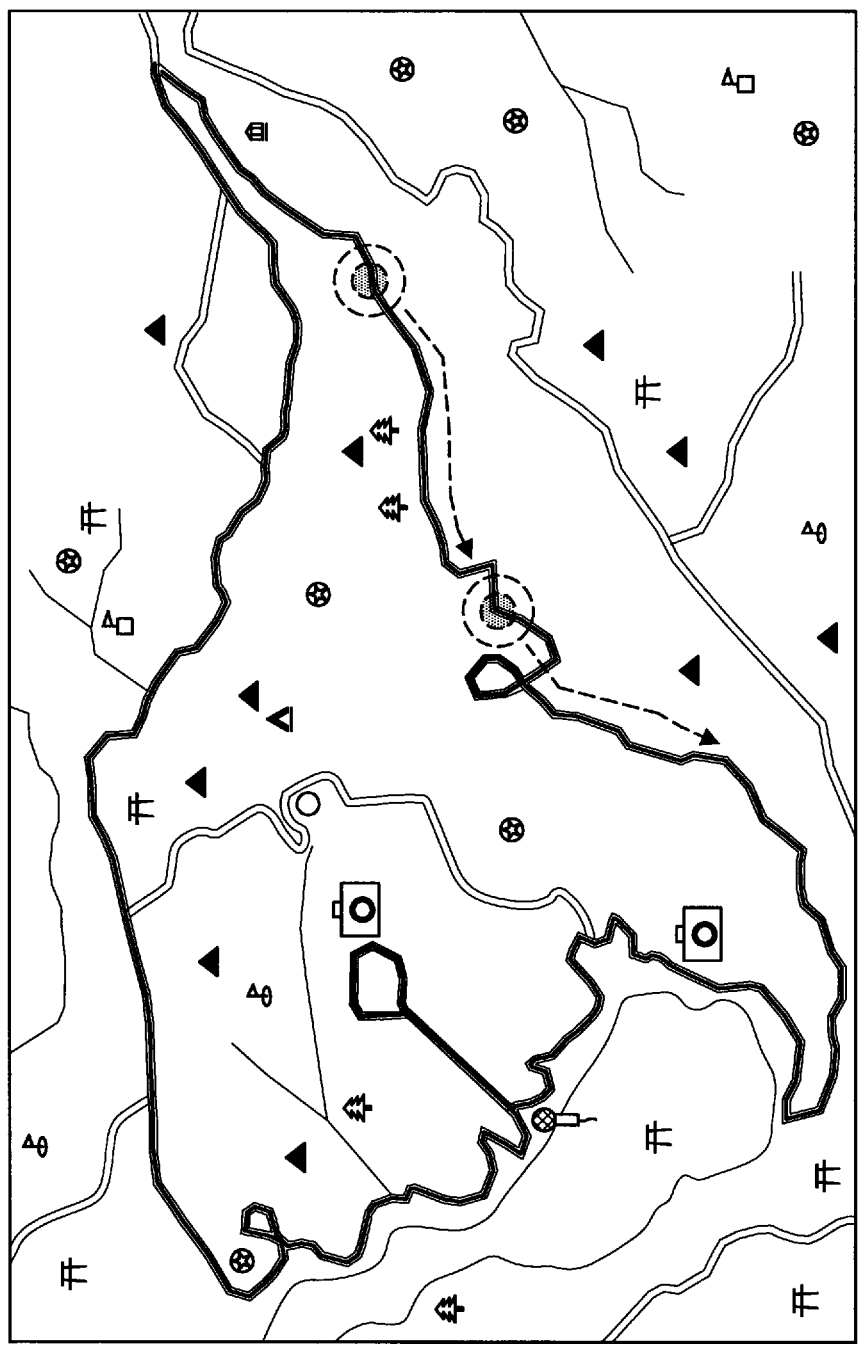
FIG. 32 is an explanatory diagram showing a playback example of a movement trace in accordance with movement of a symbol.

First, an outline of a function provided by an information processing apparatus according to an embodiment of the present disclosure will be described. Here, for easier understanding of differences from technology of the past, first, an outline of the technology of the past will be described with reference to FIGS. 29 to 31. FIG. 30 is an explanatory diagram showing an example of a movement trace superimposed on a map. Further, FIG. 31 is an explanatory diagram showing an example of playback of photograph data whose link is provided on a map. FIG. 32 is an explanatory diagram showing a playback example of a movement trace in accordance with movement of a symbol.

In the past, a function of acquiring position information was provided to limited devices, for example, mainly to a car navigation device. Currently, however, every information processing apparatus is provided with the function of acquiring position information. For example, a position information-acquisition function is becoming a standard function provided to a mobile phone, and, in addition, the position information-acquisition function is provided to every portable information processing apparatus such as a digital camera, a portable game device, a notebook PC (Personal Computer), and a portable music playback device.

Further, in the field of navigation devices there is provided a portable navigation device which is called a PND (Personal Navigation Device) and which can be attached and detached easily. Accordingly, in the case where a user moves using means other than a car, for example, on foot, by public transportation, and by bicycle, an environment in which position information can be acquired is becoming organized. When a history of position information is recorded using such an information processing apparatus, the movement trace information of the user can be generated.

In the past, such movement trace information was provided in a manner that the movement trace information was superimposed on a map and displayed, as shown in FIG. 30 for example. In this case, when position information of a photographing point is included in photograph data and the like, a camera mark may be shown on the map indicating that there is the photograph data photographed at that point. For example, as shown in FIG. 31, the photograph data is displayed by clicking the camera mark. Alternatively, the photograph itself may be displayed on the map.

Further, as shown in FIG. 32, there is also a case where a state of movement is visually expressed by moving a symbol along a movement trace superimposed on a map.

In an embodiment of the present disclosure, it is suggested to divide the movement trace information and handle the divided movement trace information as a track. Further, pieces of content such as a photograph and audio are each handled as a track, and, a movement trace track generated from movement trace information and a content track generated from content may be put into a management file as one album. Accordingly, there may be handled as one album based on an appropriate unit such as "trip to Hakone" and "24th December".

Figure 2:
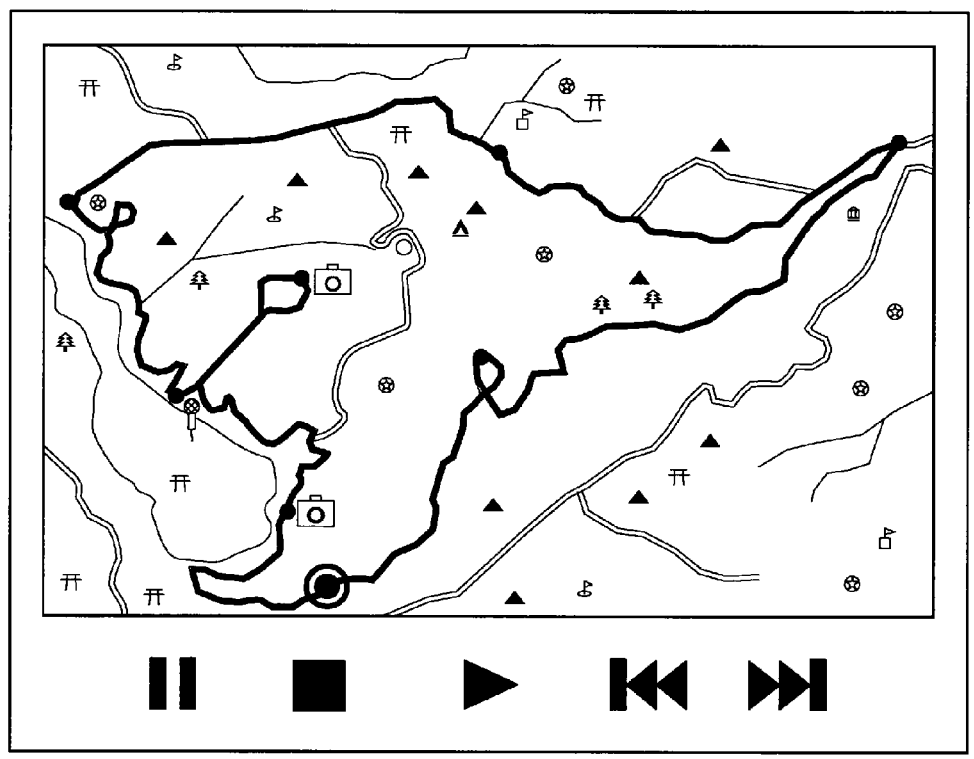
FIG. 2 is an explanatory diagram showing an example of movement trace track playback.

For example, FIG. 1 shows an example of movement trace information which is divided into seven parts at seven division points DP1 to DP7. In this way, the movement trace information divided into appropriate units may be played by, as shown in FIG. 2 for example, visually expressing a state of movement by moving a symbol PP representing a playback point along a movement trace superimposed on a map.

In this case, the playback of the movement trace is performed on a track basis. The track (or segment) is handled in the same way as the content track generated from another photograph or audio, and is capable of accepting the same kind of operation as the playback of a music track of the past. That is, in response to operation performed by a user using an input section, there is performed operation such as playback, fast-forward, skip, fast-rewind, pause, stop, and frame advance.

Figure 3:
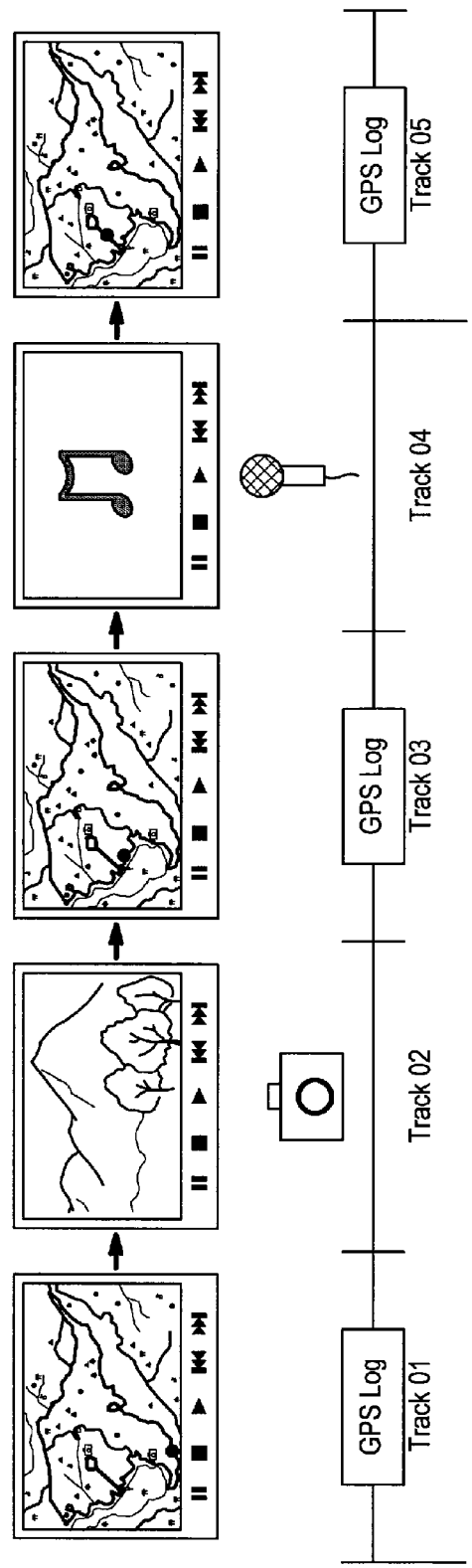
FIG. 3 is an explanatory diagram showing an outline of track playback.

Further, the movement trace information is divided at a time point at which a photograph is taken and at a time point at which audio is recorded, and tracks are arranged in chronological order. In this case, when the content group is played, the symbol PP moves along the movement trace superimposed on the map. Next, when the symbol PP arrives at a time point at which a photograph is taken, then the playback of the photograph is performed. In this case, when multiple photographs are taken at a same point, the playback of the photographs may be performed as a slide show. Further, when the playback of the photographs is completed, the next movement trace track is played. Next, when the symbol PP further arrives at a time point at which audio is recorded, then the playback of the audio is performed. The state of the operation is shown in FIG. 3.

Note that, hereinafter, there is written "GPS log" or the like in figures and the like, and the GPS log or the like is a kind of the movement trace information. Of pieces of movement trace information, a history of the position information acquired by a GPS is referred to as GPS log. Although it is written GPS log as an example, the history of position information is not limited thereto and may be another piece of movement trace information. For example, the position information can be obtained by acquiring movement distance and movement azimuth using a sensor, and performing calculation using the detected values. Alternatively, the position information may be calculated using radio communication based on access point-identification information and a received signal level. The movement trace information is a concept including pieces of position information acquired by those various methods.

Further, the movement trace information is not necessarily history information of the position information. The movement trace information may be any information as long as it is a trace of the position information associated with time information. For example, the movement trace information may not be a history of actual movement, but may be schedule information. For example, the movement trace information as the schedule information may be generated using a route search function.

Hereinafter, a configuration for realizing such functions will be described in detail. First, a PND which is an example of an information processing apparatus having the following functions is given as an example and a functional configuration of the PND will be described, the functions of the information processing apparatus including: a function of acquiring position information first and generating movement trace information in which the position information and time information are associated with each other; a function of generating, from the movement trace information, a movement trace track enabling a user to watch and listen to a state of movement by the movement trace track being played; a function of generating a track list including the movement trace track; a function of playing the track list; and a function of providing information of an analysis result of the movement trace track.

2. First Embodiment

PND

A PND 10 according to a first embodiment of the present disclosure is a device having functions of generating, editing, and playing movement trace information as described above in addition to the navigation function. That is, in the present embodiment, the PND 10 is an information processing apparatus having combination of functions as a navigation device, a movement trace information-generation device, a movement trace information-editing device, and a movement trace information-playback device. Here, the PND 10 will be described as a device having the combination of all the functions, but the present disclosure is not limited to such an example. For example, the PND 10 may be realized as a device having a part of the functions described above.

Figure 4:
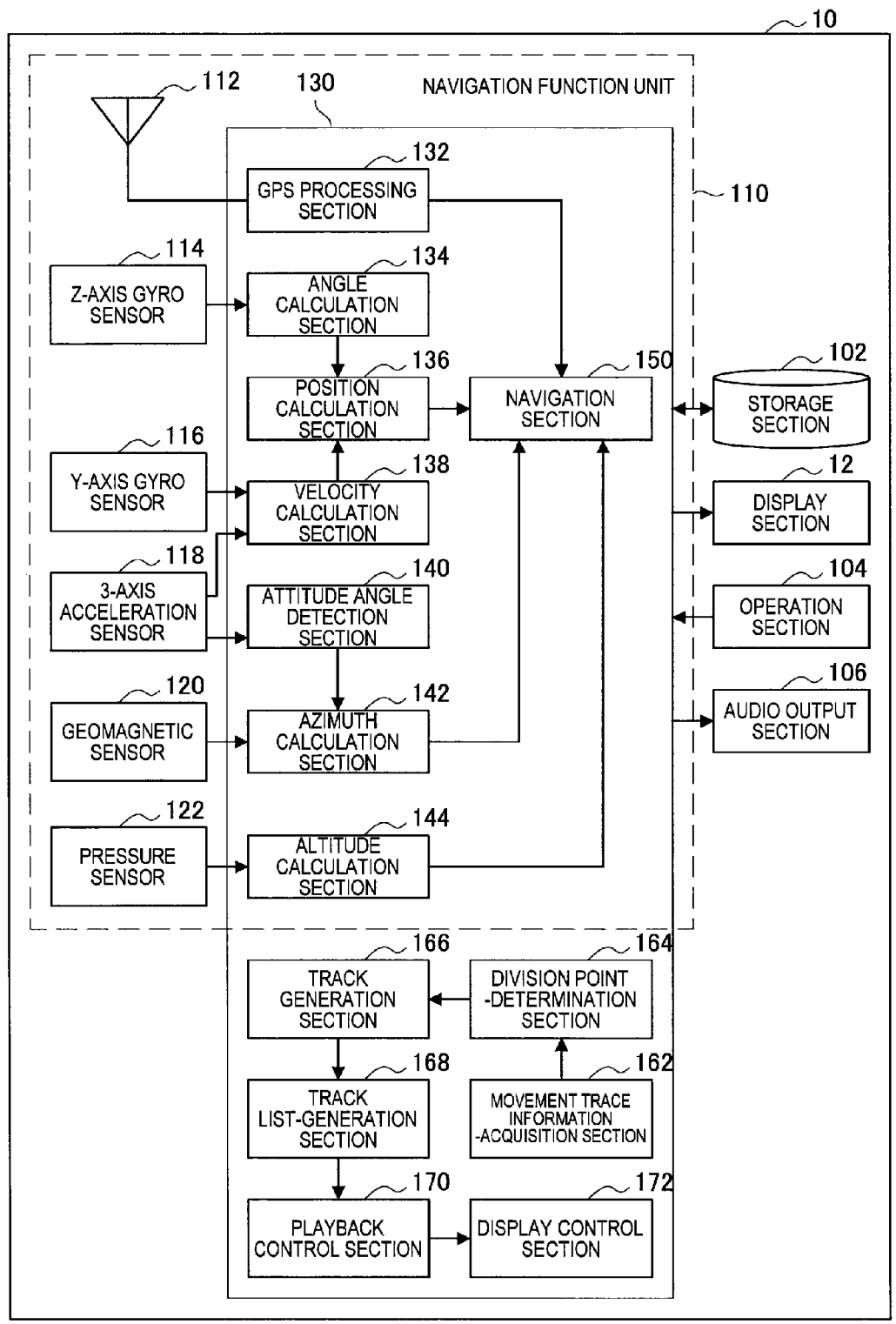
FIG. 4 is a block diagram showing a configuration of an information processing apparatus (PND) according to a first embodiment.

FIG. 4 is a block diagram showing a configuration of the PND 10 which is an example of an information processing apparatus according to the first embodiment of the present disclosure. Referring to FIG. 4, the PND 10 mainly includes a navigation function unit 110, a storage section 102, a display section 12, an operation section 104, an audio output section 106, a movement trace information-acquisition section 162, a division point-determination section 164, a track generation section 166, a track list-generation section 168, a playback control section 170, and a display control section 172.

Further, a part of the navigation function unit, the movement trace information-acquisition section 162, the division point-determination section 164, the track generation section 166, the track list-generation section 168, the playback control section 170, and the display control section 172 are realized as functions of a control section 130 implemented by an arithmetic processing means such as a CPU (Central Processing Unit).

Here, the storage section 102 is a storage medium which stores a program for the PND 10 to operate, map data, and the like. Further, in the present embodiment, the storage section 102 stores a history of position information acquired by the navigation function unit 110 as the movement trace information.

Note that the storage section 102 may be, for example, a storage medium such as a non-volatile memory such as a Flash ROM (or Flash Memory), an EEPROM (Electrically Erasable Programmable Read-Only Memory), and an EPROM (Erasable Programmable ROM), a magnetic disk such as a hard disk and a disc-like magnetic disk, an optical disk such as a CD (Compact Disc), a DVD-R (Digital Versatile Disc Recordable), and a BD (Blu-Ray Disc (registered trademark)), and an MO (Magneto Optical) disk.

The display section 12 is a display device which outputs a display screen in accordance with control of the control section 130. The display section 12 may be a display device such as an LCD (Liquid Crystal Display) and an organic EL (Electroluminescence) display.

The operation section 104 accepts an operation instruction from the user, and outputs the operation contents to the control section 130. Examples of the operation instruction by the user include various types of operation instruction related to the editing and playback of the movement trace information. Further, from a viewpoint of the navigation device, there are exemplified setting a destination, enlarging/reducing the scale of a map, setting a vocal guidance, and setting a screen display.

Further, the operation section 104 may be a touch screen which is provided in an integrated manner with the display section 12. Alternatively, the operation section 104 may have a physical configuration such as a button, a switch, and a lever, which is provided separately from the display section 12. Further, the operation section 104 may be a signal reception section which detects a signal indicating an operation instruction by the user transmitted from a remote controller.

The audio output section 106 is an output device which outputs audio data, and is a speaker and the like. The audio output section 106 outputs audio data relating to various types of content played by the playback control section 170. Examples of the output audio data include music, recorded audio, and sound effects. Further, when functioning as a navigation device, the audio output section 106 outputs navigation audio guidance. The user listens to the audio guidance, which enables the user to find out a route to a destination even without watching the display section 12.

Figure 5:
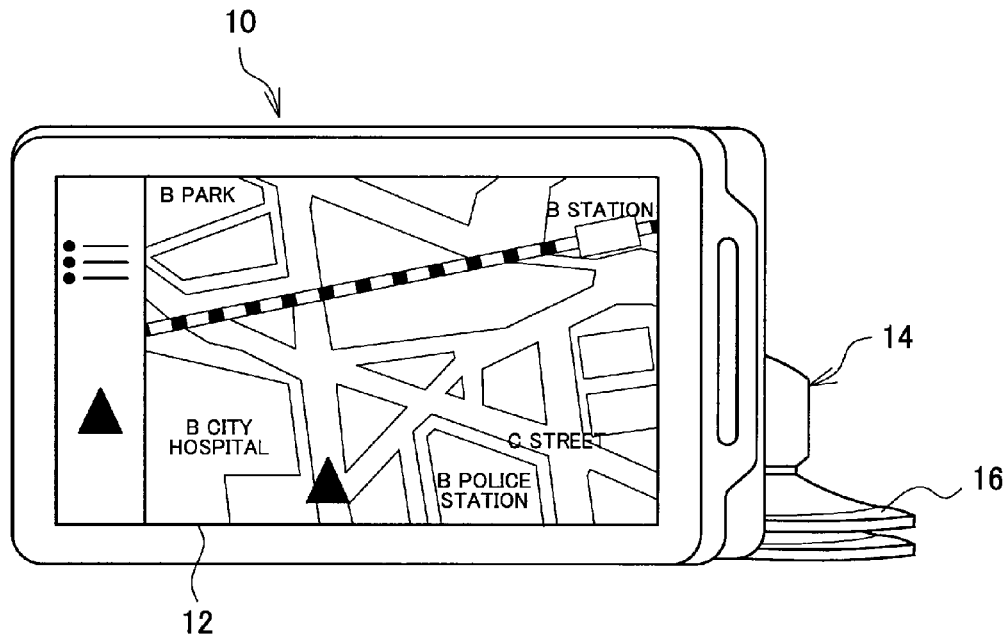
FIG. 5 is an external view showing an example of an external appearance of the PND.

Here, an external appearance example of the PND 10 will be described with reference to FIG. 5. The PND 10 has a display section 12, and is held by a cradle 14 which is attached to a dashboard of a vehicle via a suction cup 16. The PND 10 and the cradle 14 are mechanically and electrically connected to each other. Therefore, the PND 10 is configured to operate by power supplied from a vehicle battery via the cradle 14, and, when detached from the cradle 14, the PND 10 is also configured to operate independently by power supplied from a built-in battery.

(2-1. Navigation Function Unit (Generation of Movement Trace Information))

Here, there will be described in detail an example of a configuration of the navigation function unit 110 which functions as a movement trace information-generation section of the PND 10. The navigation function unit 110 mainly includes a GPS antenna 112, a Z-axis gyro sensor 114, a Y-axis gyro sensor 116, a 3-axis acceleration sensor 118, a geomagnetic sensor 120, a pressure sensor 122, a GPS processing section 132, an angle calculation section 134, a position calculation section 136, a velocity calculation section 138, an attitude angle detection section 140, an azimuth calculation section 142, an altitude calculation section 144, and a navigation section 150.

In the present embodiment, the navigation function unit 110 has a function of acquiring the movement trace information serving as a movement history. Note that, although the navigation function unit 110 may generate the movement trace information serving as schedule information using a route search function and the like, a case of acquiring a movement history will be described in the present embodiment below.

The GPS antenna 112 is capable of receiving GPS signals from multiple GPS satellites, and inputs the received GPS signals to the GPS processing section 132. Note that the GPS signals received here include orbital data indicating orbits of the GPS satellites and information such as transmission time of the signals.

The GPS processing section 132 calculates position information indicating the current position of the PND 10 based on the multiple GPS signals input from the GPS antenna 112, and supplies the navigation section 150 with the calculated position information. Specifically, the GPS processing section 132 calculates a position of each of the GPS satellites from the orbital data obtained by demodulating each of the multiple GPS signals, and calculates a distance between each of the GPS satellites and the PND 10 from a difference between a transmission time and a reception time of the GPS signal. Then, based on the calculated positions of the respective GPS satellites and the distances from the respective GPS satellites to the PND 10, a current three-dimensional position is calculated.

In addition to the absolute position-acquisition function using the GPS antenna 112 and the GPS processing section 132, the navigation function unit 110 has a relative position-acquisition function using various sensors. Information of the relative position may be used in a situation where it is difficult for the PND 10 to acquire an absolute position, that is, in a situation where the PND 10 is at a position at which it is difficult to receive a GPS signal. Alternatively, the information of the relative position may be used in combination with the information of the absolute position.

Figure 6:
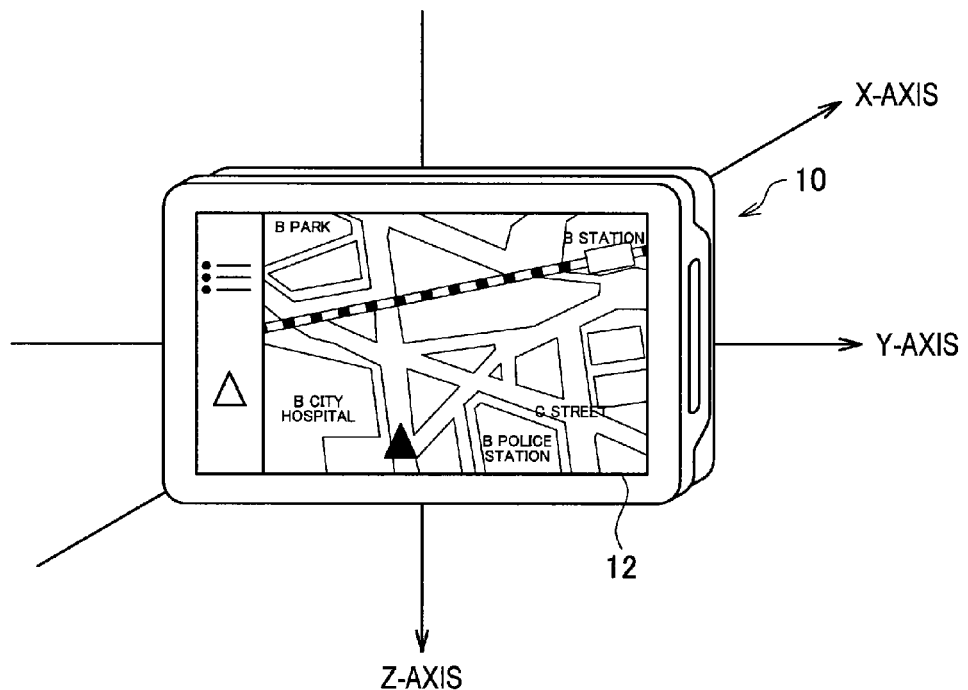
FIG. 6 is an explanatory diagram showing a definition of a coordinate system of the PND.

The Z-axis gyro sensor 114 is a sensor having a function of detecting, as a voltage value, a yaw rate Wz which is a variable velocity (angular velocity) of the rotation angle around the Z-axis when the PND 10 is rotated. The Z-axis gyro sensor 114 detects the yaw rate at a sampling frequency of 50 Hz, for example, and inputs data indicating the detected yaw rate to the angle calculation section 134. Note that, as shown in FIG. 6, the Z-axis corresponds to the vertical direction. The X-axis corresponds to a travelling direction of the PND 10, and the Y-axis corresponds to the horizontal direction that is perpendicular to the X-axis.

The angle calculation section 134 calculates an angle T of when the PND 10 is rotated by multiplying the yaw rate Wz input from the Z-axis gyro sensor 114 by a sampling frequency (here, for example, 0.02 s), and inputs angle data indicating the angle T to the position calculation section 136.

The Y-axis gyro sensor 116 is a sensor having a function of detecting, as a voltage value, a pitch rate Wy which is an angular velocity around the Y-axis. The Y-axis gyro sensor 116 detects the pitch rate at a sampling frequency of 50 Hz, for example, and inputs data indicating the detected pitch rate to the velocity calculation section 138.

The 3-axis acceleration sensor 118 is a sensor having a function of detecting, as voltage values, an acceleration rate Ax along the X-axis, an acceleration rate Ay along the Y-axis, and an acceleration rate Az along the Z-axis. The 3-axis acceleration sensor 118 detects the acceleration rate Ax, the acceleration rate Ay, and the acceleration rate Az at a sampling frequency of 50 Hz, for example, and inputs data indicating the detected acceleration rates to the velocity calculation section 138 and the attitude angle detection section 140.

The velocity calculation section 138 divides the acceleration rate Az along the Z-axis input from the 3-axis acceleration sensor 118 by the pitch rate Wy input from the Y-axis gyro sensor 116, thereby calculating a velocity V in the travelling direction 50 times per second, for example, and inputs the calculated velocity V to the position calculation section 136.

The position calculation section 136 has a function of calculating position information of a current position based on the velocity V calculated by the velocity calculation section 138 and the angle T calculated by the angle calculation section 134. Specifically, the position calculation section 136 calculates an amount of change from the position at the previous calculation to the current position based on the velocity V and the angle T. Then, the position calculation section 136 calculates current position information from the amount of change and the previous position. After that, the position calculation section 136 supplies the navigation section 150 with the position information of the current position.

The attitude angle detection section 140 generates, to begin with, attitude angle data indicating an attitude angle of the PND 10 by performing a predetermined attitude angle detection processing based on the acceleration rate data Ax, Ay, and Az which are input from the 3-axis acceleration sensor 118, and inputs the attitude angle data to the azimuth calculation section 142.

The geomagnetic sensor 120 is a sensor having a function of detecting, as voltage values, geomagnetism Mx, geomagnetism My, and geomagnetism Mz in the X-axis direction, the Y-axis direction, and the Z-axis direction, respectively. The geomagnetic sensor 120 inputs the detected geomagnetism data Mx, My, and Mz to the azimuth calculation section 142.

The azimuth calculation section 142 performs a predetermined correction processing to the geomagnetism data Mx, My, and Mz input from the geomagnetic sensor 120, and generates azimuth data indicating an azimuth of the PND 10 based on the corrected geomagnetism data and the attitude angle data input from the attitude angle detection section 140. The azimuth calculation section 142 supplies the navigation section 150 with the generated azimuth data.

That is, the geomagnetic sensor 120, the 3-axis acceleration sensor 118, the attitude angle detection section 140, and the azimuth calculation section 142 each function as a so-called electronic compass and generates the azimuth data. Mainly in the case where the PND 10 is used by being detached from the cradle 14 (for example, in the case where the PND 10 is used when the user is walking), the navigation section 150 uses the azimuth data and provides the user with map data which is being displayed in a manner that the direction of the map data is adjusted to the direction of the PND 10. Note that, when the PND 10 is used by being installed in a car, the PND 10 may associate a road in the map data with the car position based on the route of the car position, and may provide the user with the map data, the direction of which is adjusted to the direction of the PND 10 based on the azimuth of the map. Alternatively, there can be provided the user with map data, the direction of which is adjusted to the direction obtained by calculating the direction of the PND 10 using an acquired GPS azimuth.

The pressure sensor 122 is a sensor having a function of detecting, as a voltage value, the surrounding pressure. The pressure sensor 122 detects the detected pressure data at a sampling frequency of 50 Hz, for example, and inputs the detected pressure data to the altitude calculation section 144.

The altitude calculation section 144 calculates the altitude of the PND 10 based on the pressure data input from the pressure sensor 122, and provides the navigation section 150 with the calculated altitude data.

According to the above configuration, the navigation section 150 is capable of acquiring the current position information from the GPS processing section 132 or the position calculation section 136, acquiring the azimuth that the PND 10 is heading for from the azimuth calculation section 142, and acquiring the altitude of the PND 10 from the altitude calculation section 144. Based on the acquired information, the navigation section 150 acquires map data of the surroundings of the current position from map data stored in the storage section 102, and shows a route to a destination which is set by the user by using the operation section 104, with a display screen of the display section 12 and output audio from the audio output section 106.

Here, although the navigation section 150 can use the acquired information related to the position as it is, various corrections may be provided thereto. For example, a typical example of the correction processing includes map matching processing. The map matching processing is a technique which uses map information for correcting an error of the position information. With the map matching processing, relevant roads on the map are searched based on the change of the position information and correct position information is estimated, and based on the estimation, the position information is corrected.

Further, as described above, the navigation function unit 110, which also functions as a movement trace information-acquisition section, generates movement trace information by causing the storage section 102 to store the acquired position information. The movement trace information may be information of the absolute position provided by the GPS processing section 132 and the movement trace information may be stored as it is. Alternatively, the movement trace information may be information of the relative position calculated by various sensors and the movement trace information may be stored. Alternatively, the corrected position information generated by executing, by the navigation section 150, the correction processing such as map matching may be stored.

(2-2. Division of Movement Trace Information)

Next, division processing of movement trace information, which is one of the functions of the PND 10, will be described. The movement trace information-acquisition section 162 acquires movement trace information including position information and time information associated with the position information, and determines whether or not the acquired movement trace information is movement trace information to be analyzed. Then, in the case where the acquired movement trace information is an analysis target, the movement trace information-acquisition section 162 passes the movement trace information to the division point-determination section 164.

In this case, the movement trace information-acquisition section 162 acquires movement trace information stored in the storage section 102, for example. Alternatively, the movement trace information-acquisition section 162 may acquire movement trace information from an external device via an interface section (not shown). In this case, the interface section may be a connector which connects with the external device by wire or may be a communication interface to be connected with the external device by radio.

The division point-determination section 164 has a function of determining a division point of the movement trace information input by the movement trace information-acquisition section 162 based on an analysis result of the movement trace information. In this case, the division point-determination section 164 determines a division point for dividing the movement trace information into units suitable for performing playback as movement trace tracks.

In this case, a unit suitable for performing playback of the movement trace information as a movement trace track may be basically set on a scene basis, the scene being regarded as a single event by the user. There is a possibility that the movement trace information includes movement trace information of various scenes, such as "travelling on train", "travelling on foot while taking landscape photographs", "staying at theme park", and "travelling by car". There is a possibility that the movement trace information may have a unit that has a meaning as a single event for the user, like the scene units mentioned above. As the units to be divided into, it is effective to use scenes as one basis.

Further, as described above, in order that the movement trace track is played in combination with a content track generated from a photograph, audio, and the like, in the case where there is content such as a photograph or audio associated with position information, the movement trace information may be divided at that time point. By dividing the movement trace information at the time point at which there is the content such as photograph or audio associated with the position information, it becomes possible to perform playback of the content such as photograph or audio in the middle of the playback of the movement trace information. Note that, although not shown here, in the case where the PND 10 has an imaging function or an audio recording function, there may be used stored content, in which the photograph or audio acquired by those functional sections is associated with position information, for the division of the movement trace information.

(Division Operation)

Figure 7:
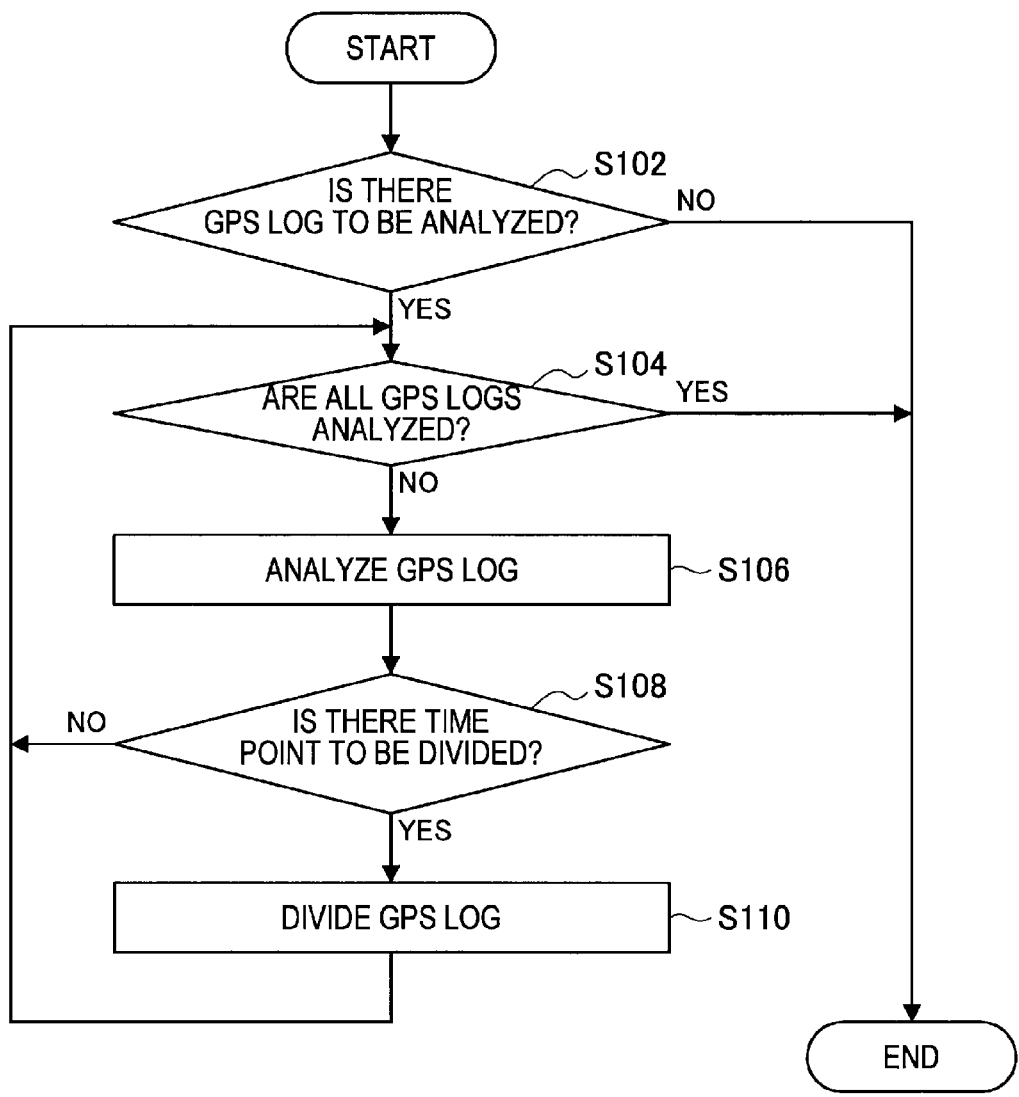
FIG. 7 is a flowchart showing an example of division processing of movement trace information.

Next, there will be described, with reference to the flowchart of FIG. 7, a flow of the division processing of the movement trace information realized by the movement trace information-acquisition section 162 and the division point-determination section 164. FIG. 7 is a flowchart showing a flow of movement trace information-division processing operation performed by the PND 10.

The present division processing is started when the movement trace information-acquisition section 162 acquires movement trace information. Then, the movement trace information-acquisition section 162 determines whether or not there is movement trace information to be analyzed among the pieces of acquired movement trace information (S102). In the determination of Step S102, in the case where there is no movement trace information to be analyzed, the division processing to the movement trace information is not performed, and the processing is terminated.

On the other hand, in the determination of Step S102, in the case where it is determined that there is the movement trace information to be analyzed, the movement trace information-acquisition section 162 inputs the acquired movement trace information to the division point-determination section 164.

Next, the division point-determination section 164 determines whether or not all pieces of movement trace information are analyzed (S104), and in the case where all the pieces of movement trace information are analyzed, the processing is terminated. On the other hand, in the case where there is movement trace information which is not yet analyzed, the division point-determination section 164 analyzes the movement trace information which is not analyzed yet (S106).

Based on the analysis result of the movement trace information of Step S106, the division point-determination section 164 automatically (without necessarily requiring user prompting r user input) determines whether or not there is a time point to be divided (S108). A specific determination criterion of the division point in Step S108 will be described later. In the determination of Step S108, in the case where there is a division point, the division point-determination section 164 divides the movement trace information at the determined division point (S110).

Note that, as described above, in the case where there is content data such as photograph or audio data in the time period corresponding to the movement trace information, it is preferred that the movement trace information be divided at that time point. The division processing operation taking this point into consideration will be shown in FIG. 8.

The operation from Steps S202 to S206 is the same as the operation from Steps S102 to S106 shown in FIG. 7, and hence, the description thereof is omitted. When the movement trace information is analyzed in Step S206, the division point-determination section 164 determines whether or not there is photograph or audio data in a time period to be analyzed (S208). In the case where there is content such as the photograph or audio data in the time period to be analyzed, the processing proceeds to Step S212, and the division point-determination section 164 divides the movement trace information at the time corresponding to the content.

On the other hand, in the case where there is no content such as a photograph or audio data in the time period to be analyzed, next, the division point-determination section 164 determines whether or not there is a time point at which the movement trace information is to be divided (S210). A determination criterion in Step S210 will be specifically described later. In the case where it is determined in Step S210 that there is a time point for the division, the time point is set as a division point, and the division point-determination section 164 divides the movement trace information at the division point.

(Division Criterion)

Next, there will be described below an example of the criterion for the division point-determination section 164 to determine the division point. As described above, the division point is determined on the basis of a unit suitable for performing playback of the movement trace information as a movement trace track. In this case, the unit suitable for performing playback of the movement trace information as a movement trace track may be basically set on a scene basis, the scene being regarded as a single event by a user. Further, as another example of the unit suitable for performing playback of the movement trace information as a movement trace track, in the case where there is content such as a photograph or audio at a position or in a time period corresponding to the movement trace information, that time point may be set as the division point.

Figure 9:
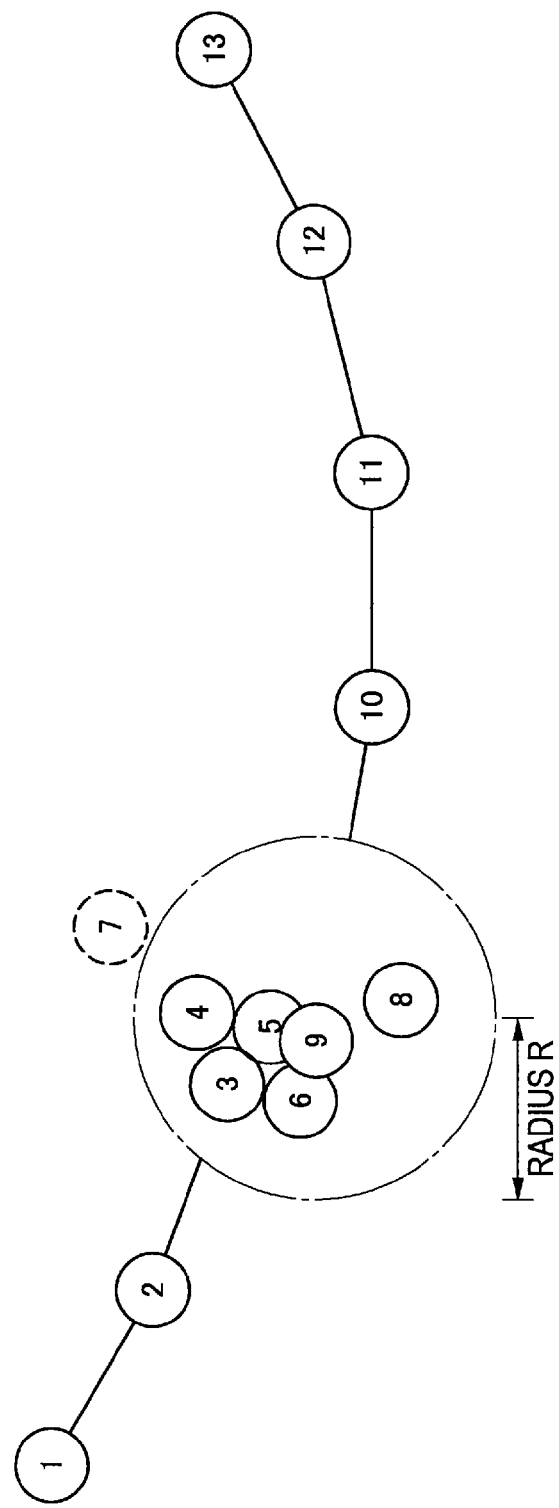
FIG. 9 is an explanatory diagram showing a specific example of division point determination based on a stay point.
Figure 10:
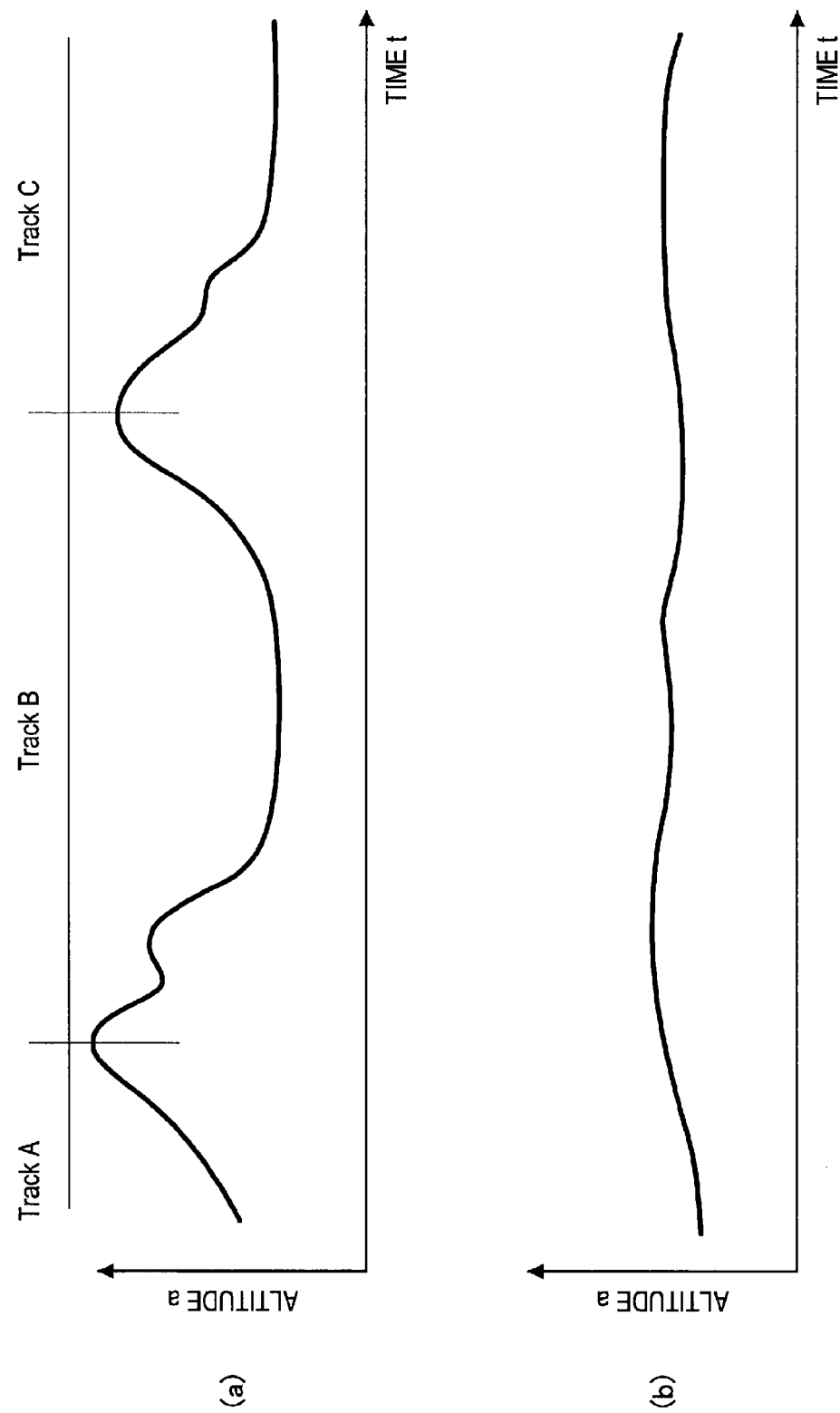
FIG. 10 is an explanatory diagram showing a specific example of division point determination based on altitude information.
Figure 11:
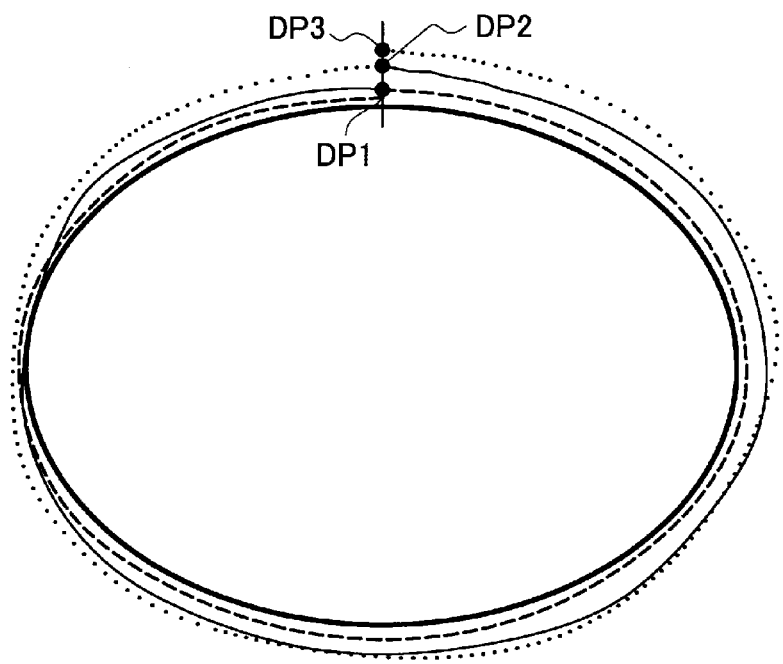
FIG. 11 is an explanatory diagram showing a specific example of division point determination in an example of orbiting movement.
Figure 12:
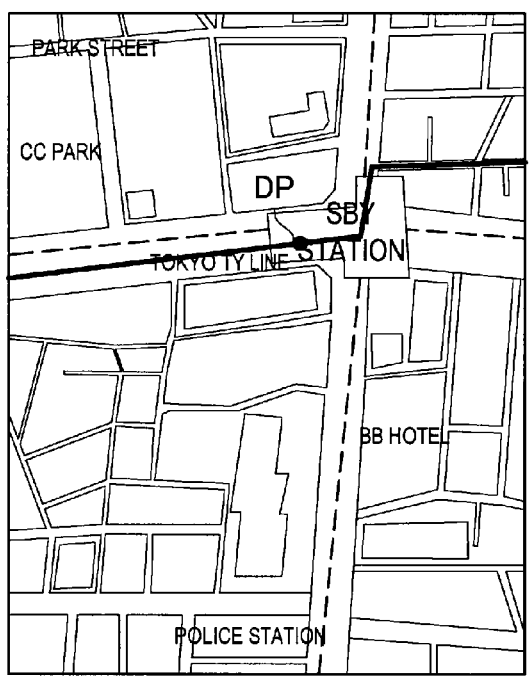
FIG. 12 is an explanatory diagram showing a specific example of division point determination based on transportation means estimation.

The specific examples of the criterion of the division point determination will be described with reference to FIGS. 9 to 12. FIGS. 9 to 12 are each an explanatory diagram showing a specific example of the division point determination criterion. Specifically, FIG. 9 is an explanatory diagram showing a specific example of the division point determination based on a stay point. Further, FIG. 10 is an explanatory diagram showing a specific example of the division point determination based on altitude information. FIG. 11 is an explanatory diagram showing a specific example of the division point determination in an example of orbiting movement. FIG. 12 is an explanatory diagram showing a specific example of the division point determination based on transportation means estimation.

(Division at Stay Part)

First, referring to FIG. 9, there are shown 13 pieces of position information, from 1st position information to 13th position information. Of those, among 3rd position information to 9th position information, six pieces of position information other than 7th position information each indicate a position within a range of a radius R. In such a case, the division point-determination section 164 determines that, out of the movement trace information, a part from the 3rd position information to 9th position information to be a stay part.

As a determination criterion of the stay part, there are exemplified the following, for example: i or more pieces of position information are sequentially contained within a distance range, the distance being specified by a radius R or the like; or position information is continuously contained within a range of the radius R for t-hours or longer. In this case, the position information which is deviated from the range of the radius R (for example, the 7th position information shown in FIG. 9) may be permitted up to s percent. The stay position is calculated from the center of a set circle and the positional center of gravity within the circle.

In the case where the movement trace information has the stay part, the division point-determination section 164 may determine a division point from the stay part. For example, the division point-determination section 164 may set, as the division point, at least any one of a start point of the stay part, an end point (time point from which movement starts again) of the stay part, and a midpoint of the start point and the end point.

For example, the division point-determination section 164 may determine, as the division point, at least any one of the start point of the stay part, the end point of the stay part, and the midpoint of the start point and the end point. Alternatively, the division point-determination section 164 may set the start point and the end point of the stay part as the division points, and may determine the division points such that the stay part can be set as a stay track. The stay track is a kind of the movement trace track, and may be used in a manner to express time connection by being played in a way of expressing the stay part.

(Division Based on Altitude Information)

Further, referring to FIG. 10, there are shown time-series altitude change of movement trace information (a) and time-series altitude change of movement trace information (b). In the case where position information includes altitude information, the division point-determination section 164 may analyze the altitude information and determine the division point. For example, the division point-determination section 164 may set a time point at which the altitude becomes a peak as a division point. At that time, in the case where a track interval does not become an appropriate value when all peak points are divided, there may be used the following as criteria for the peak determination: "peak intervals are more than a set distance away from each other"; "inclination angle is small before and after the peak"; and the like.

Further, whether or not it is a peak point is determined on the basis that the inclination is equal to or more than a set value based on the altitude information. Accordingly, for the movement trace information (b), the division point based on the altitude information is not determined, because the inclination thereof is smaller than a predetermined value.

(Division for Orbiting Movement)

Referring to FIG. 11, there are shown a movement trace of orbiting movement and division points DP1 to DP3. For example, as for the movement trace information which indicates that orbiting movement is being performed in an athletic field or a running course, the division point-determination section 164 may set the time point of returning to the same point as the division point. By setting the time point of returning to the same point as the division point, there may be considered a way of utilizing the division point, like analyzing the lap time per lap, for example.

(Division Based on Estimation of Transportation Means)

Referring to FIG. 12, there is shown a movement trace around a station. It is estimated that the movement trace information moves the road in front of the station, and after that, enters the station and got on a train. The division point-determination section 164 may also set a time point DP, as a division point, at which the movement trace information is estimated to get on the train. In this case, the division point-determination section 164 may set, as the division point, a part at which the speed abruptly changes based on the speed change of the movement trace information. Further, the division point-determination section 164 may determine the division point by estimating a state of a user based on at least any one of the position information and information of the speed change.

For example, in the case where the position information indicates the station and, after that, the position information indicates that the position information is moving on the positions on a railway track, the division point-determination section 164 may determine that the position information gets on a train, and may set a time point at which the position information getting on the train as the division point. In this case, the division point-determination section 164 may calculate the speed from the change of the position information while moving along the railway track, may estimate transportation means based on the speed, and may determine the division point.

Other Division Examples

In addition to the above, there are considered various division criteria. For example, the division point may be set at a part where the movement trace information is missing. In this case, in the same manner as the stay part, the division point may be determined based on at least any one of a start point of the missing part, an end point of the missing part, and a midpoint of the start point and the end point. The movement trace information may be divided using, as the division point, one of the start point of the missing part, the end point of the missing part, and the midpoint of the start point and the end point. Alternatively, the division point may be determined in a manner that the start point of the missing part and the end point of the missing part are set as the division points such that a missing track indicating the missing part can be set.

Alternatively, as described above, in the case where there is content data such as a photograph or audio memo, the division point-determination section 164 may set, as the division point, a time point corresponding to the position or the time at which the content is photographed or recorded. Alternatively, the division point-determination section 164 may automatically determine the division point simply at the turn of the day, a set interval, and a specified time.

Modified Example of Division Operation

Real-Time Division

Figure 8:
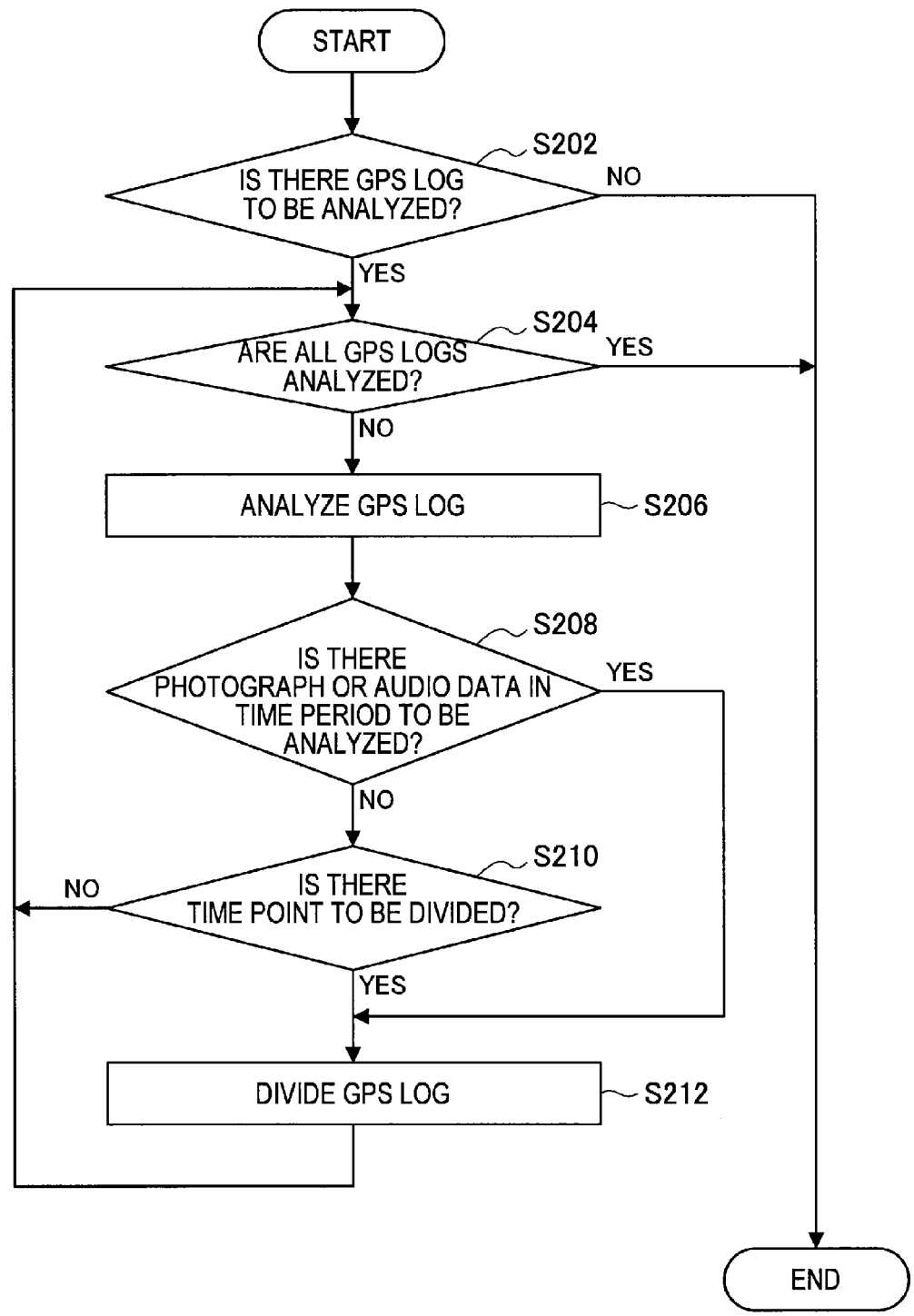
FIG. 8 is a flowchart showing another example of the division processing of the movement trace information.

In the above, although there have been described the examples of performing the division processing to the accumulated movement trace information with reference to FIGS. 7 and 8, the present disclosure is not limited to such examples. The division processing may be performed in real time. That is, analysis and division processing may be performed to the movement trace information while being recorded.

Figure 13:
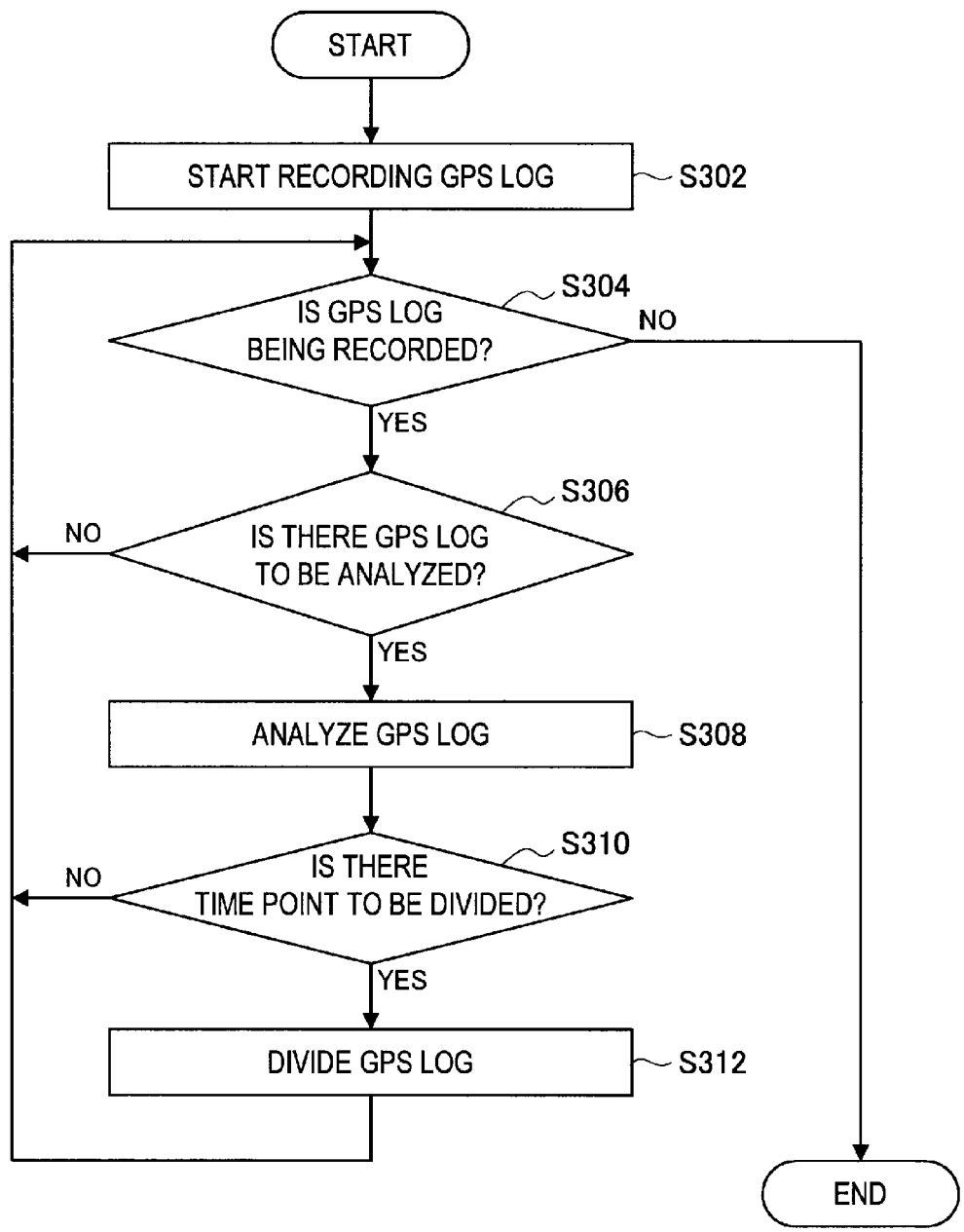
FIG. 13 is a flowchart showing a modified example of division processing of movement trace information.

The division processing operation in this case is shown in FIG. 13. FIG. 13 is a flowchart showing a modified example of the division processing of the movement trace information. The operation shown in FIG. 13 is started when the navigation function unit 110 starts recording the position information as the movement trace information (S302).

First, when the navigation function unit 110 starts recording the movement trace information, the movement trace information-acquisition section 162 determines whether or not the operation of recording the movement trace information is being continued (S304). Then, until the recording operation is completed, the operation from Steps S306 to S312 to be described below are repeated. In the case where the operation of recording the movement trace information is completed, the processing of the present flowchart is completed.

On the other hand, in the case where the operation of recording the movement trace information is being continued, the movement trace information-acquisition section 162 determines whether or not there is movement trace information to be analyzed (S306), and in the case where there is movement trace information to be analyzed, the movement trace information-acquisition section 162 passes the movement trace information to the division point-determination section 164.

Next, the division point-determination section 164 analyzes the movement trace information passed from the movement trace information-acquisition section 162 (S308). Based on the analysis result, the division point-determination section 164 determines whether or not there is a time point to be divided (S310), and in the case where there is a time point to be divided, the division point-determination section 164 sets the time point as a division point, and divides the movement trace information at the division point (S312).

Note that, although not shown, in the case where the PND 10 has an imaging function or an audio recording function, when the division processing is performed while recording the movement trace information, the movement trace information may be divided at the time when the imaging or audio recording function is activated.

(2-3. Generation of Track)

Returning to FIG. 4 again, the description of the functional configuration of the PND 10 will be continued. The PND 10 can generate, with the function of the track generation section 166, a movement trace track based on the movement trace information divided by the division point-determination section 164.

The track generation section 166 has a function of generating a movement trace track from the movement trace information based on the division point. Further, the track generation section 166 can also generate a content track from content data such as a photograph or audio memo. Specifically, the track generation section 166 has a function of converting the data into a form in which the data can be played as a track and adding various attribute parameters related to the track.

The track generation section 166 can add an attribute parameter to each track in accordance with a form which is set in advance. For example, the track generation section 166 has a function of adding, to the movement trace track, the attribute parameter such as a track name, a name indicating a position, date and time, a movement distance, time required, and transportation means. The track generation section 166 has a function of automatically adding the attribute parameter, and also has a function of editing the attribute parameter in accordance with information input from the operation section 104.

For example, the track generation section 166 can give a name to a track based on the position information included in the movement trace information. The track generation section 166 may generate the track name by combining pieces of information such as an address, a name of a road, a regional name, and a proper noun. For example, examples of the track name based on the position information include "around intersection A, Route 1", "B station", and "1-C street, Konan ward C". The position information in this case may be any one of the start point and the end point of the track. Alternatively, the track generation section 166 may extract and use a typical name of a place from among pieces of position information included in the track. Further, the start point and the end point of the track may be used in combination. For example, as an example of the combined track name, there is exemplified "around intersection A, Route 1 to around intersection D, Route 1".

Further, the track generation section 166 can also give a name to a track based on the time information included in the movement trace information. The track generation section 166 has a function of generating the track name based on any one of a start time and an end time of the track, for example. Alternatively, the track generation section 166 may generate the track name using the start time and the end time of the track in combination. For example, as the track name based on the time information, there can be exemplified "11:20" and "11:20 to 11:55".

If a particular track is of special significance, a user may enter a nickname for the track and the track generation section 166 associates the nickname with the track. Likewise, a user may edit a name of any particular track name that was automatically generated. It is preferred that the tracks be distinguished from each other by the names, and hence, the track generation section 166 gives each track a name such that there is no track name that overlaps between tracks. For example, in order that the track name does not overlap between tracks, the track generation section 166 may extract a name indicating a position to be used. Alternatively, in the case where the track name overlaps between tracks, there may be added a code to the name indicating a position, which is for distinguishing one track from another. Alternatively, the position information and the time information may be used in combination.

Further, the track generation section 166 is also capable of adding transportation means to a track as an attribute parameter of the track based on the movement trace information. Here, for example, in the case where the PND 10 has operation modes such as an in-vehicle mode, a bicycle mode, and a pedestrian mode, and information of switching between the operation modes is included in the movement trace information, the track generation section 166 may determine the transportation means using the information. Alternatively, the track generation section 166 may determine the transportation means based on an analysis result of the movement trace information. For example, in the case where the position information of the movement trace information moves on the sea or a lake, the track generation section 166 can estimate that the transportation means is a ship. Further, in the case where the position information moves on a railway track, the track generation section 166 may estimate, taking into consideration the movement speed, that the transportation means is a train.

The track generation section 166 may use the parameter of the transportation means when giving the track name to the track described above. For example, the track generation section 166 can give the name of "ship" to the track in the case where the transportation means is estimated to be a ship. Alternatively, the track generation section 166 can give a name to the track by combining the transportation means with at least one of the time information and the position information. For example, the track generation section 166 may give the track the name of "ship, from AA port to BB port", or the like.

Further, the track generation section 166 is capable of associating various types of content with each track. The track generation section 166 may associate content with the track based on information input from the operation section 104. Alternatively, in the case where the position information is added to content, the track generation section 166 may associate the content with a track having the movement trace information around the position information that is added to the content. As the content to be associated with here, there can be exemplified a photograph and text memo. The content associated with the track may be provided to the user with the position information when the track is being played, for example. Accordingly, the content associated with the track is preferably the content that has a relationship with the position information of the track. For example, as a photograph to be associated with the track, there can be considered a landscape photograph to be a highlight place among the positions included in the track to be a target. Alternatively, in the case of associating the text memo with the track, examples of contents to be written in the text memo include information of landscape on the route which the track passes through, a state of the road, reason why the road is chosen, and what the user felt on the route. Further, in the case where the track to be a target is generated from movement trace information as schedule information, the track generation section 166 may associate, with the track, the memo in which a caution about the route or a reason for choosing the route is written as an explanation to another person at the time point the schedule is created.

Further, although it is described that the content here is a photograph or text memo, the content is not limited thereto. For example, the content to be associated with the track may be an audio memo, a moving image, and an illustration.

(2-4. Generation of Track List)

The track list-generation section 168 has a function of generating a track list, which is a list of track groups containing at least a movement trace track generated from movement trace information including position information and time information associated with the position information. There may be included in the track list a content track generated from content data such as a photograph or audio memo.

Further, the track list-generation section 168 may add a name to the track list. The name may be the one based on at least any one of the position information and the time information, in the same manner as the track name. For example, examples of the track list name include "action on 25th December" and "Hakone". Further, in the case where the PND 10 has a scheduler function, the track list-generation section 168 may give a name to the track list based on information in the scheduler and the movement trace information. For example, in the case where there is a schedule of "study tour in Hakone" on 25th December, the name of the track list generated from the movement trace information on 25th December may be set to "study tour" or the like.

(2-5. Playback of Track)

The playback control section 170 has a function of controlling playback of a movement trace track and a content track. In playing a track list, in the case where operation using the operation section 104 is not performed, the playback control section 170 is capable of sequentially playing the tracks included in the track list. Further, the playback control section 170 may have a random playback function in the same manner as the music track playback.

In performing playback of the movement trace track, the playback control section 170 can cause the display control section 172 to display a playback screen in which a symbol indicating position information is superimposed on a map. Further, when playing, out of the content tracks, a photograph track generated from photographs, the playback control section 170 causes the display control section 172 to display a playback screen including photograph data. The playback control section 170 causes the playback screen including photograph data to be displayed for the playback time that is set in the content track in advance.

At that time, in the case where music data or the like to be played with the playback of the movement trace track or the photograph track is set in the track, the playback control section 170 may control such that the set music data is played simultaneously.

Figure 14:
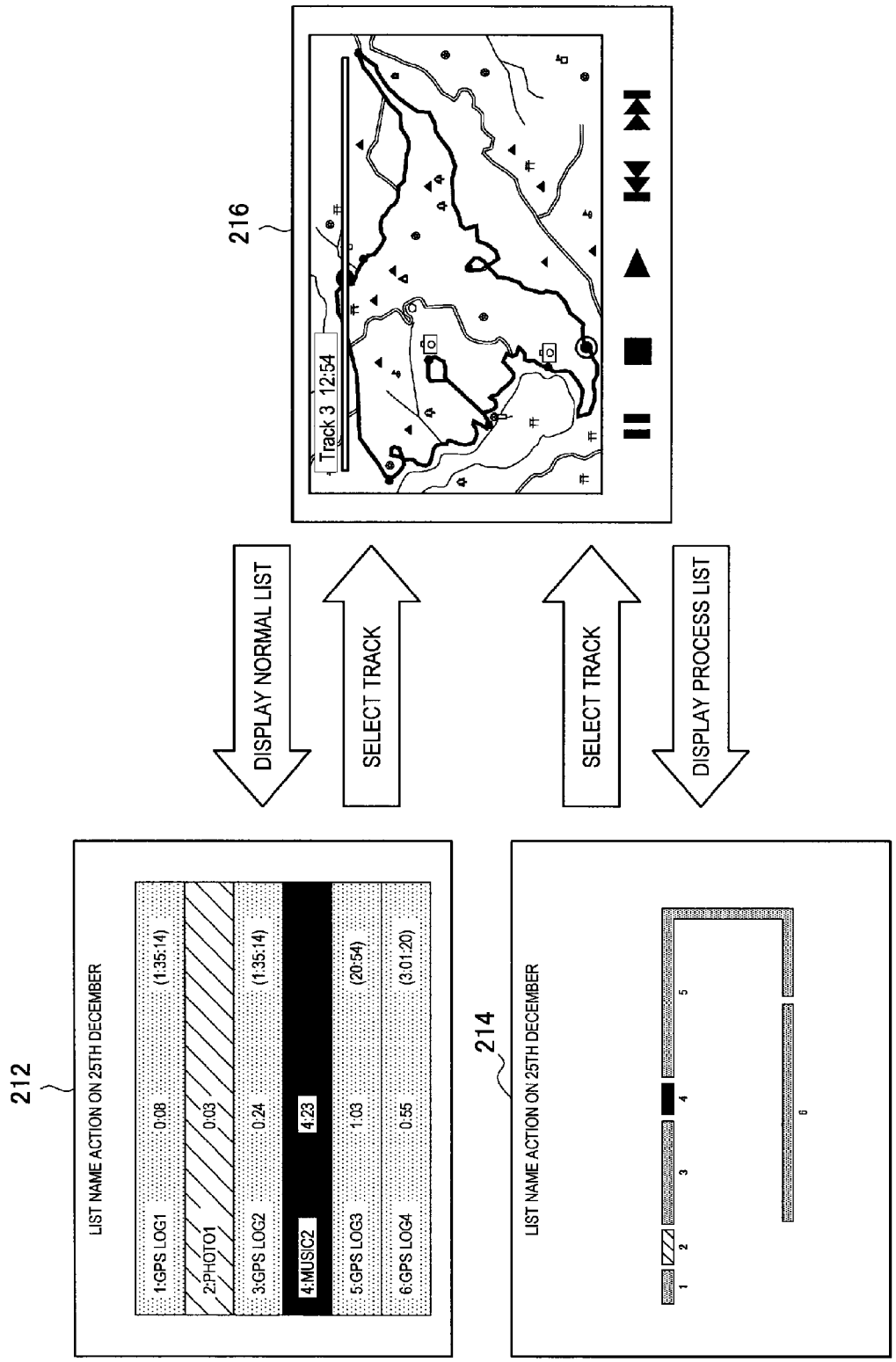
FIG. 14 is an explanatory diagram showing an example of screen transition between list screens and a playback screen.

In the track playback, the display control section 172 causes to display a list screen for mainly displaying a track list and a playback screen displayed during playback of each track. For example, as shown in FIG. 14, the display control section 172 can mainly provide a normal list screen 212 which displays a track list in which the movement trace track and the content track are mixed in a form of a table, a process list screen 214 which displays the track list in terms of processes, and a playback screen 216 of each track. FIG. 14 is an explanatory diagram showing an example of screens to be displayed by a display control section.

Based on information input by the operation section 104, the display control section 172 can switch the normal list screen 212 and the process list screen 214 with the playback screen 216. For example, when one track is selected in the normal list screen 212 or the process list screen 214, the display control section 172 causes the playback screen 216 of the selected track to be displayed.

For example, when one track is selected and the playback of the selected track is started, in the case where there is no operation input from the operation section 104, the playback control section 170 causes tracks to be played sequentially in the order of the track list (or, in a randomly selected order in the case of random playback) as shown in FIG. 3.

Further, in the case there is an operation input from the operation section 104, the playback control section 170 performs control corresponding to the operation input. For example, in the case where a fast-forward operation is input, the playback control section 170 causes the track being played to be played at speed faster than normal speed. Further, in the case where there is performed a skip operation in forward direction, the playback control section 170 causes a playback position to be moved to the head of a track which is to be played next to the track that is being played.

(List Screen)

Figure 15:
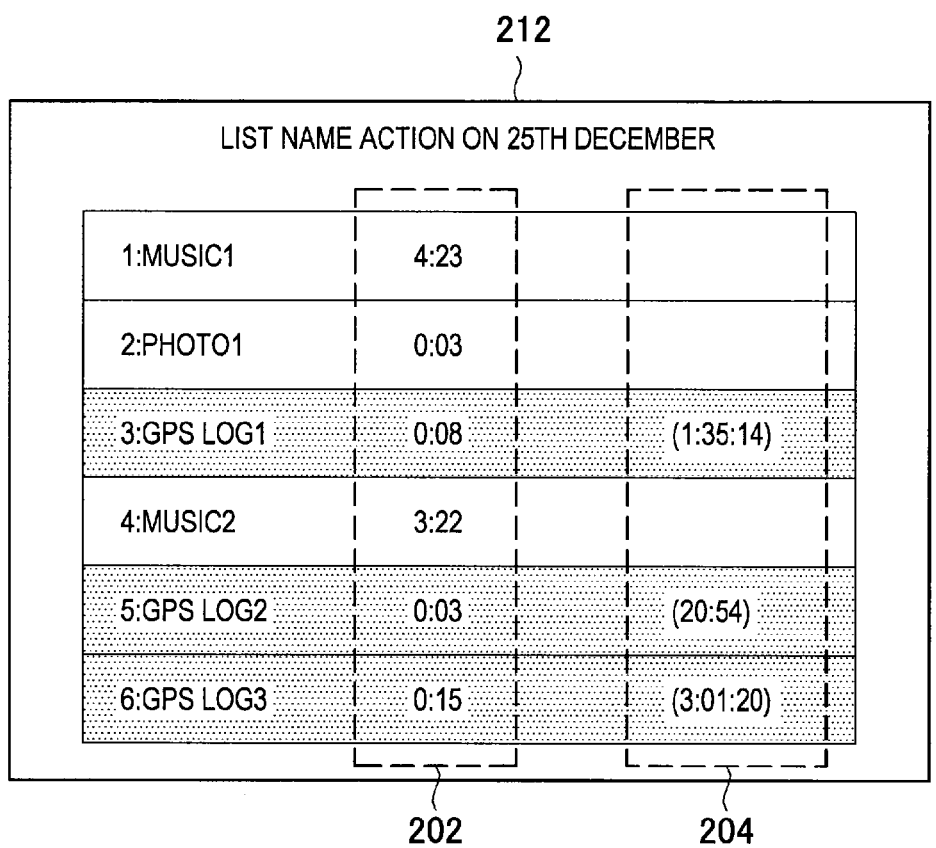
FIG. 15 is an explanatory diagram showing an example of a normal list screen.
Figure 16:
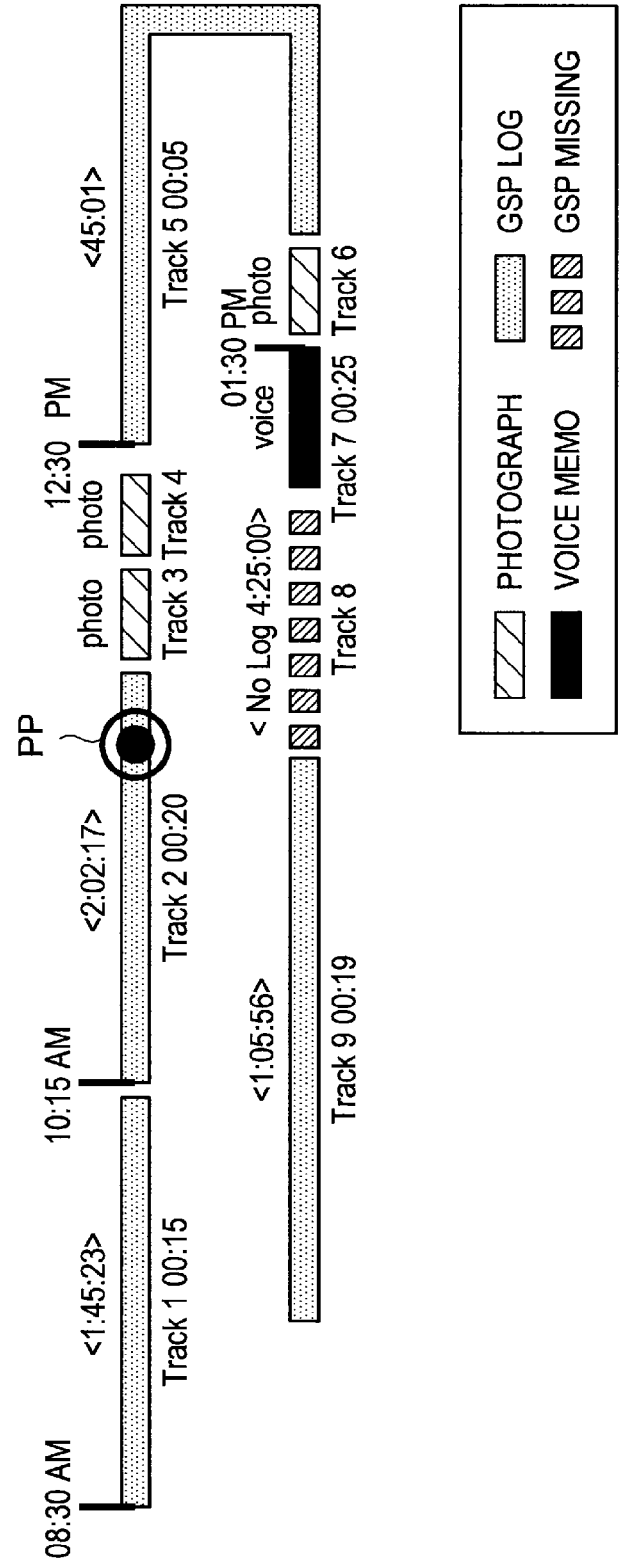
FIG. 16 is an explanatory diagram showing an example of a process list screen.
Figure 17:
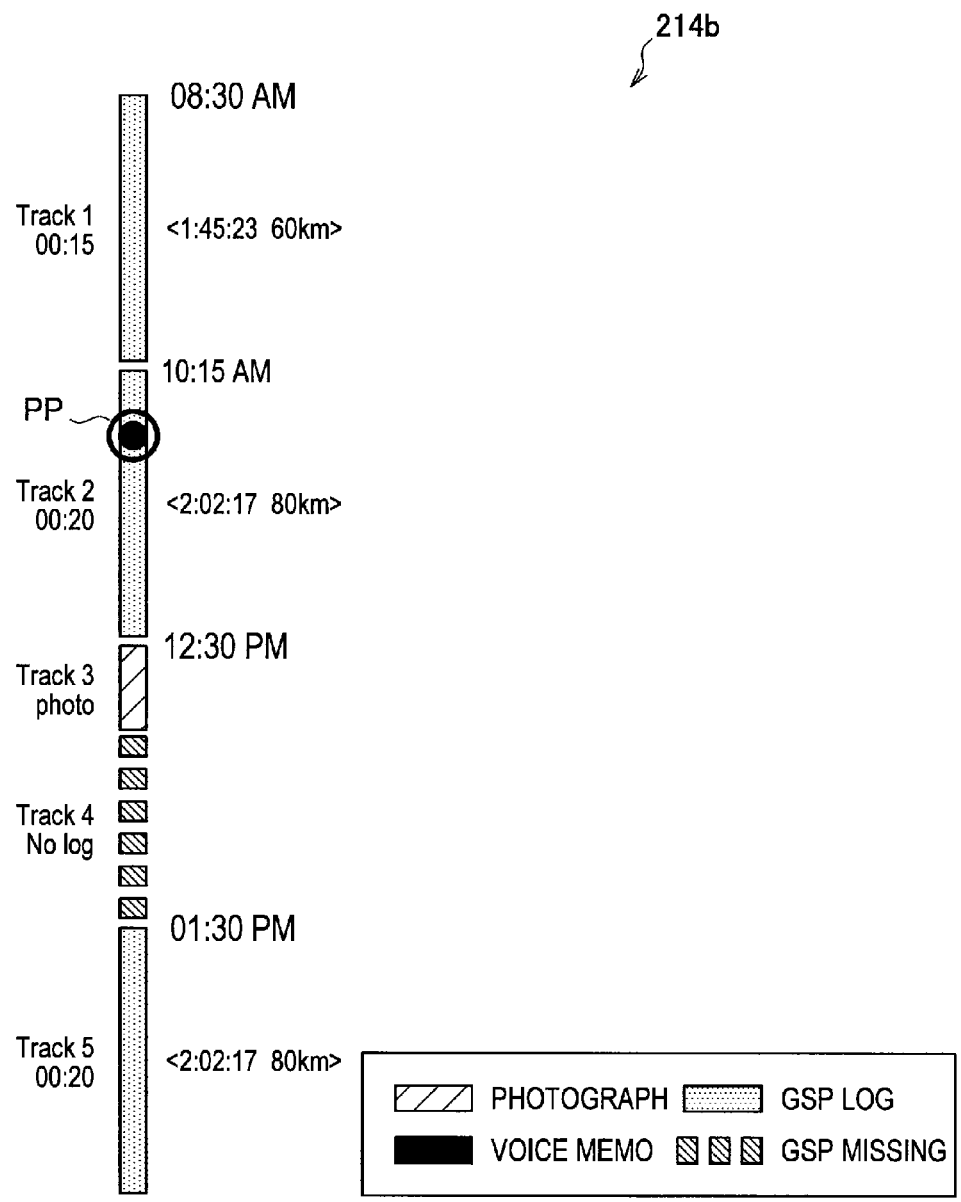
FIG. 17 is an explanatory diagram showing another example of the process list screen.

Here, the normal list screen 212 and the process list screen 214 will be described with reference to FIGS. 15 to 17. FIG. 15 is an explanatory diagram showing an example of a normal list screen, FIG. 16 is an explanatory diagram showing an example of a process list screen, and FIG. 17 is an explanatory diagram showing another example of the process list screen.

On the normal list screen 212, there are displayed attribute parameters such as a track name and time information. In this case, the normal list screen 212 may include time information 202 it takes to play each track. Further, the normal list screen 212 may include, particularly for the movement trace track, time information 204 it actually takes for the movement.

Further, although not shown, the normal list screen 212 may include a part of or an entire attribute parameters added to each track. That is, the display control section 172 may cause the normal list screen 212 to be displayed, which includes attribute parameters such as a track name, a name indicating a position, date and time, a movement distance, time required, and transportation means.

Note that, in the case where operation information for specifying an attribute parameter is input from the operation section 104 to the normal list screen 212, the display control section 172 can display the normal list screen 212 in which the order of the list is rearranged based on the specified attribute parameter. Alternatively, in the case where a search keyword is specified in the normal list screen 212, the display control section 172 can also display the normal list screen 212 in which tracks that match the specified search keyword are arranged in a list.

The process list screen 214 is a screen which expresses a track list in a process flow. For example, the process list screen 214 expresses tracks arranged in chronological order in a bar. It is preferred that the bar be expressed in such a way that colors, shapes, and the like of the tracks are different from each other depending on the types of the tracks. The bar indicating a track may be expressed as a length corresponding to playback time or actual movement time of the track.

Referring to FIG. 16, an example of the process list screen 214 is shown. There are shown pieces of related time information to respective tracks. For example, a process list screen 214a includes time information associated with position information of each track, information of time length it takes for the movement from the start of the track to the end of the track, and information of time length it takes to play the track.

For example, it can be seen from the process list screen 214a that Track 1 starts the movement from 8:30 a.m., the movement time length is 1 hour 45 minutes 23 seconds, and the time it takes for the playback is 15 seconds. Note that, although the description has been mainly made on the expression based on time here, the display control section 172 may also display a name indicating a position based on the position information of a track by being associated with the track.

Further, in the case where a track list included in the process list screen 214 is being played, the display control section 172 may display a symbol PP representing a playback position in a superimposed manner at a point indicating the playback position on the bar representing the track which is being played. With such a display, the user can see a track being played and a playback position of the track. The process list screen 214 may be expressed vertically as shown in FIG. 17. Further, in the process list screen 214, a missing track or a stay track may be displayed in different expression in order to be distinguished from other tracks. For example, the difference may be expressed by any one of a color, a pattern, and a shape of the bar representing the track.

(Playback Screen)

Figure 18:
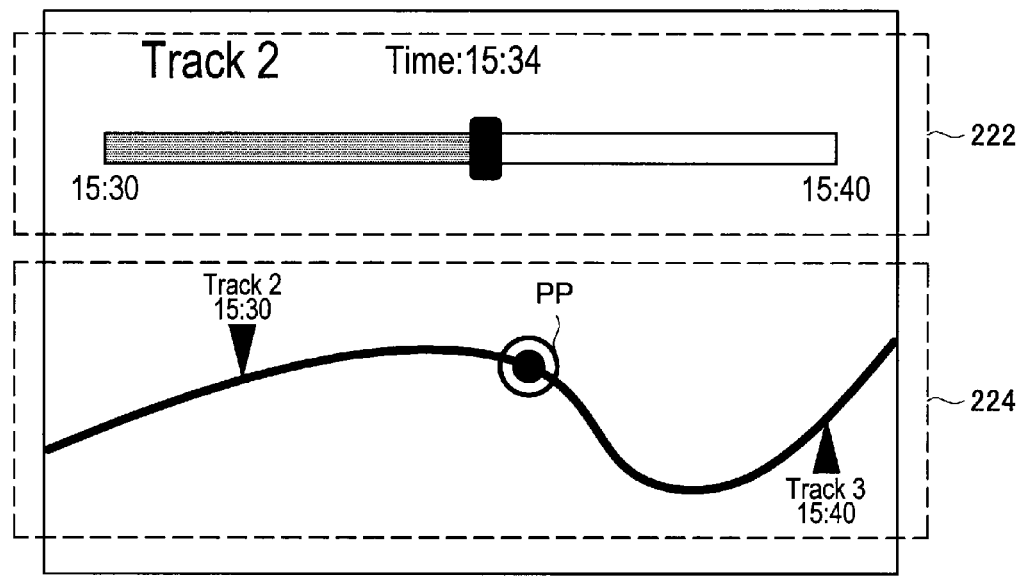
FIG. 18 is an explanatory diagram showing an example of a playback screen of a movement trace track.

Next, with reference to FIGS. 18 to 26, a playback screen of a movement trace track will be described. First, FIG. 18 is an explanatory diagram showing an example of a playback screen of a movement trace track. The playback screen of the movement trace track mainly includes a progress bar part 222 and a movement trace display part 224.

The progress bar part 222 includes a progress bar graphically expressing a ratio of a track indicating the part having already been played when the entire track which is being played is set to 100 percent, a name of a track being played, and time on the movement trace of the playback position at the time point. Further, at the beginning and the end of the progress bar, there may be displayed time of the start point and time of the end point of the track, respectively.

Figure 19:
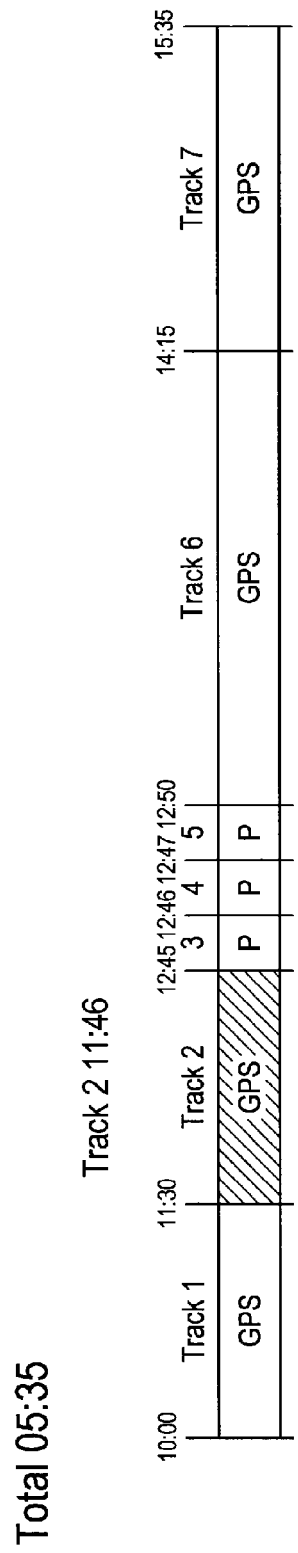
FIG. 19 is an explanatory diagram showing another display method of a progress bar part.

FIG. 19 is an explanatory diagram showing another display method of the progress bar part 222. In FIG. 18, there is displayed a progress bar of the track being played, and in FIG. 19, all tracks included in a track list are expressed in a progress bar. In this case, it is preferred that the track being played be identified by changing the color of the bar, for example. For example, there may be displayed time of a playback time point at the upper part of the bar for the track being played.

Further, each track may be expressed in a manner that a type of the track can be identified. Further, the progress bar part 222 can include a movement time length of the entire track. As for the movement trace track of each track, the start time thereof may be displayed. For example, as for a content track such as a photograph, the shooting time may be displayed.

Returning to FIG. 18 again, the description will be continued. The movement trace display part 224 may include a movement trace, a division point of each track, time of a start point of each track, and a symbol PP representing a playback position. In FIG. 18, there is shown an example of enlarging and displaying the track being played, but the example is not limited thereto, and, as shown in the playback screen 216 in FIG. 14, the movement trace may be superimposed on the map including the entire movement range. Further, although it is omitted in FIG. 18, it is preferred that the movement trace be expressed in a superimposed manner on the map, in the same manner as FIG. 14.

Figure 20:
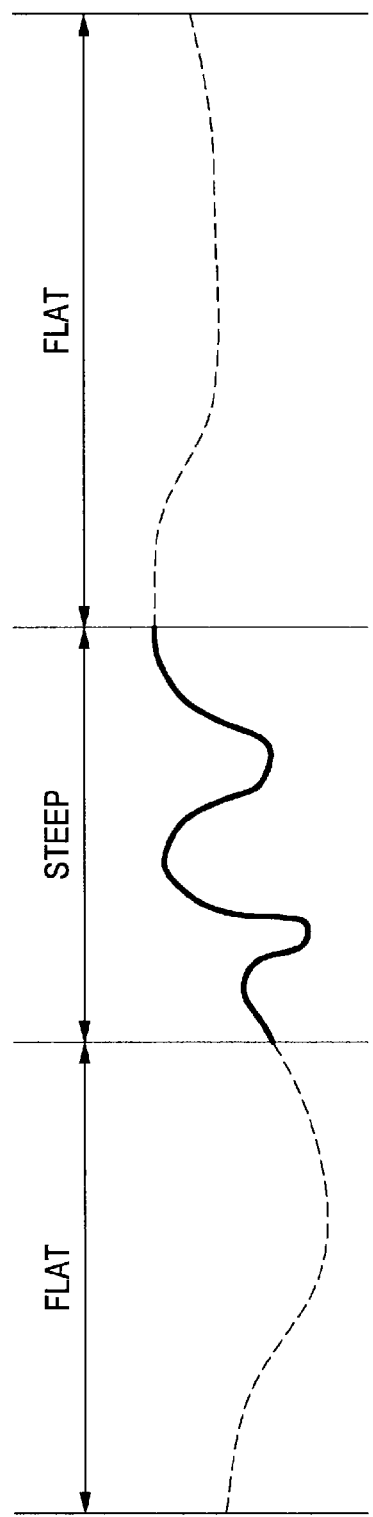
FIG. 20 is an explanatory diagram showing an example of a trace expression based on altitude information of a movement trace.
Figure 21:
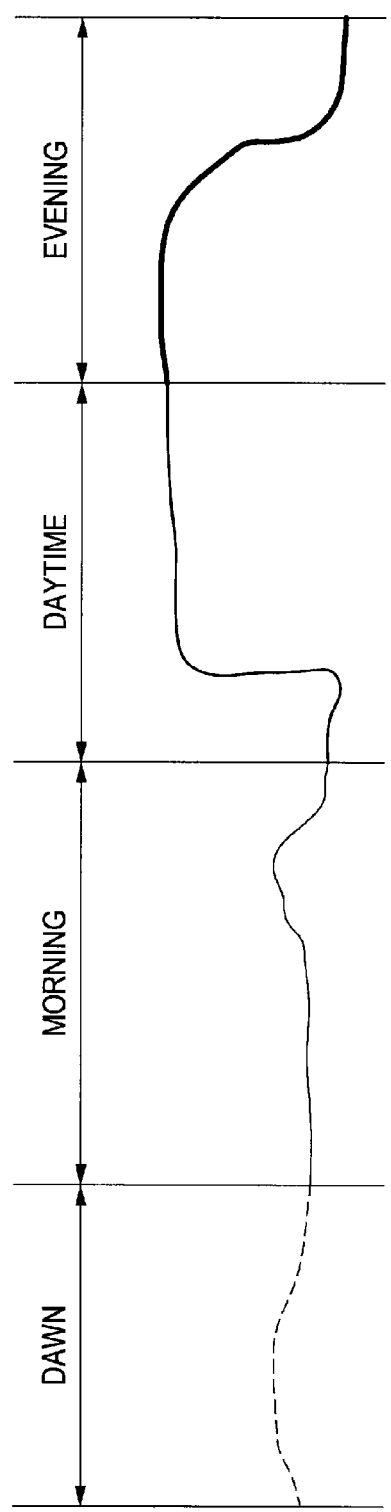
FIG. 21 is an explanatory diagram showing an example of a trace expression based on time information associated with the movement trace.
Figure 22:
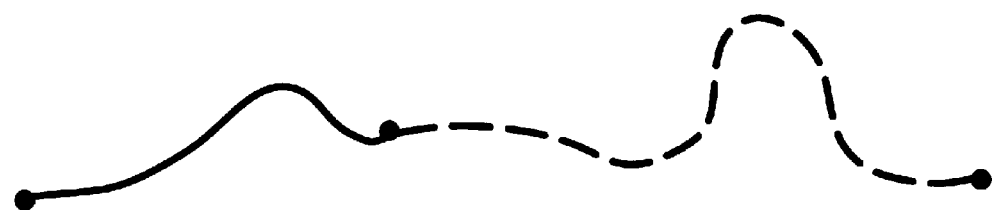
FIG. 22 is an explanatory diagram showing an example of a trace expression based on whether or not a track is being played.
Figure 23:
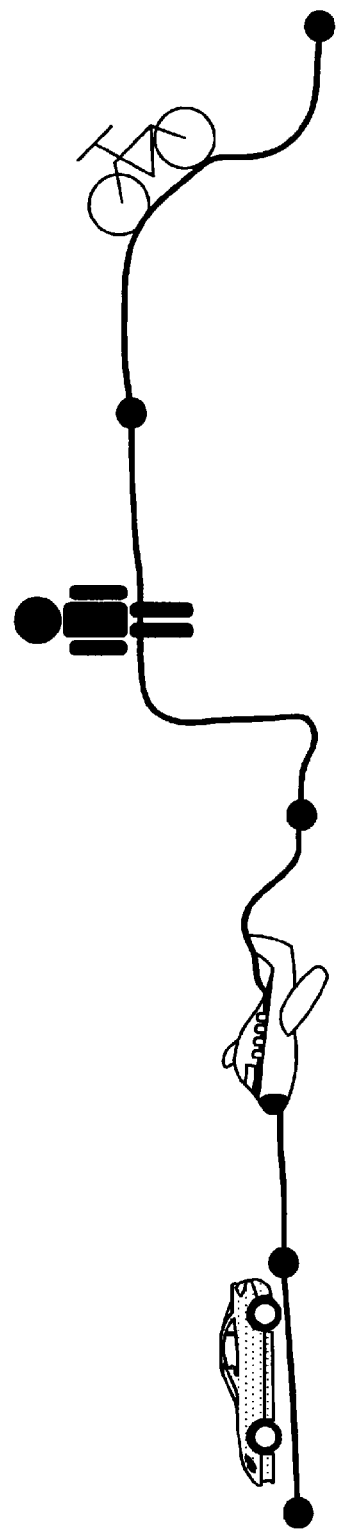
FIG. 23 is an explanatory diagram showing an example of a symbol expression illustrating a playback position based on transportation means.

There can be considered various ways in expressing the movement trace display part 224, and hereinafter, some of the ways will be exemplified. FIGS. 20 to 23 are each an explanatory diagram showing an example of an expression of a movement trace track. Specifically, FIG. 20 is an explanatory diagram showing an example of a trace expression based on altitude information of a movement trace, FIG. 21 is an explanatory diagram showing an example of a trace expression based on time information associated with the movement trace, FIG. 22 is an explanatory diagram showing an example of a trace expression based on whether or not a track is being played, and FIG. 23 is an explanatory diagram showing an example of a symbol expression illustrating a playback position based on transportation means.

For example, in the playback of the movement trace track, the expression of the line indicating the movement trace may be changed depending on altitude information. For example, the movement trace may be expressed by changing, based on the altitude information, a color, a line type, and a line width depending on a gradient. For example, the movement trace may be expressed in a manner that the steeper the gradient, the darker the color or the thicker the line. Alternatively, an impression that a color has may be reflected on the movement trace, and a movement trace of a steep part may be expressed in red or yellow and a movement trace of a flat part may be expressed in blue or green.

Further, as shown in FIG. 21, the movement trace may be expressed by changing a line type, a color, and a line width depending on a time period. In FIG. 21, the difference is expressed by the line width and the line type, but the example is not limited thereto, and the difference may also be expressed by a hue and a color density. Further, in FIG. 21, the movement trace is divided into four time periods of dawn, morning, daytime, and evening, and the difference therebetween is expressed, but the example is not limited thereto. The change of the time period may be expressed using gradations of color, for example, without setting a distinct boundary.

Alternatively, as shown in FIG. 22, the movement trace may be expressed by changing a line type, a color, and a line width in order that the track being played is distinguished from other tracks. For example, the track being played may be expressed using a line whose color is darker than the lines of the other tracks. Further, the track being played may be expressed using a line whose width is thicker than the lines of the other tracks. Further, it may also be assumed that the track being played may be expressed by changing the line type, such that the track being played is represented by a solid line and the other tracks are each represented by a dotted line.

Referring to FIG. 23, there is shown an example of changing icons each indicating a playback position depending on transportation means. The display control section 172 may change, based on information of transportation means added to the movement trace track, the symbol PP indicating the playback position into an icon corresponding to the transportation means. In FIG. 23, there are shown examples of icons in the case of travelling by bicycle, on foot, by plane, and by car.

(Provision of Analysis Information)

Figure 24:
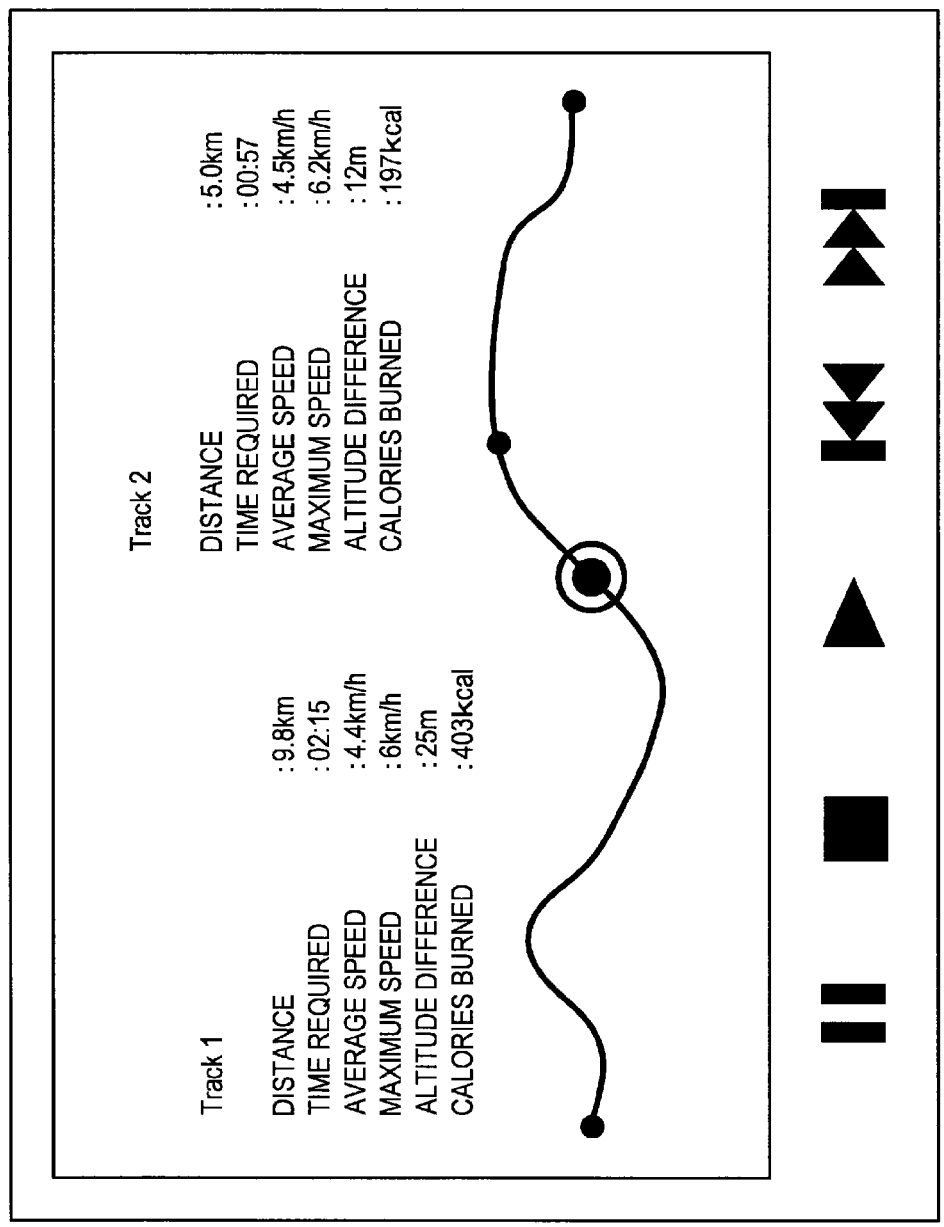
FIG. 24 is an explanatory diagram showing an example of a playback screen including analysis information.
Figure 25:
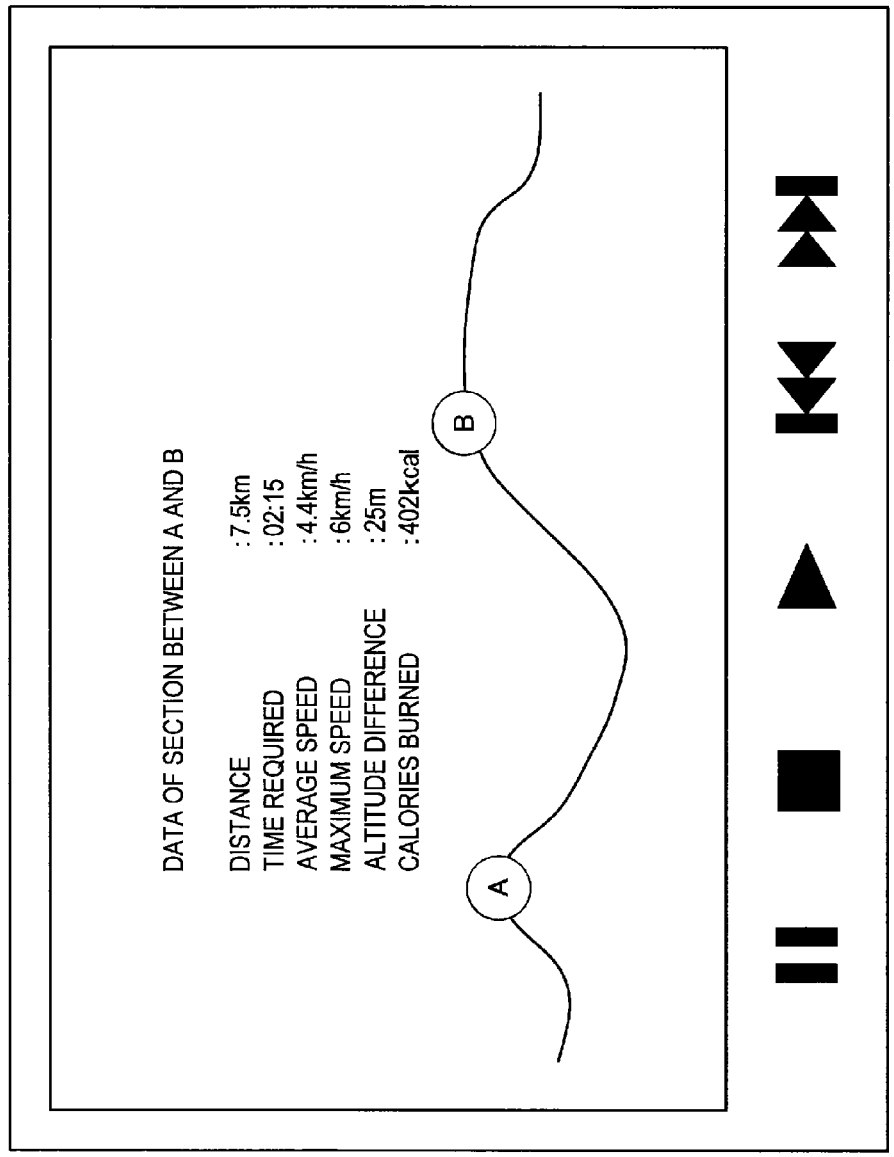
FIG. 25 is an explanatory diagram showing an example of the playback screen including the analysis information.
Figure 26:
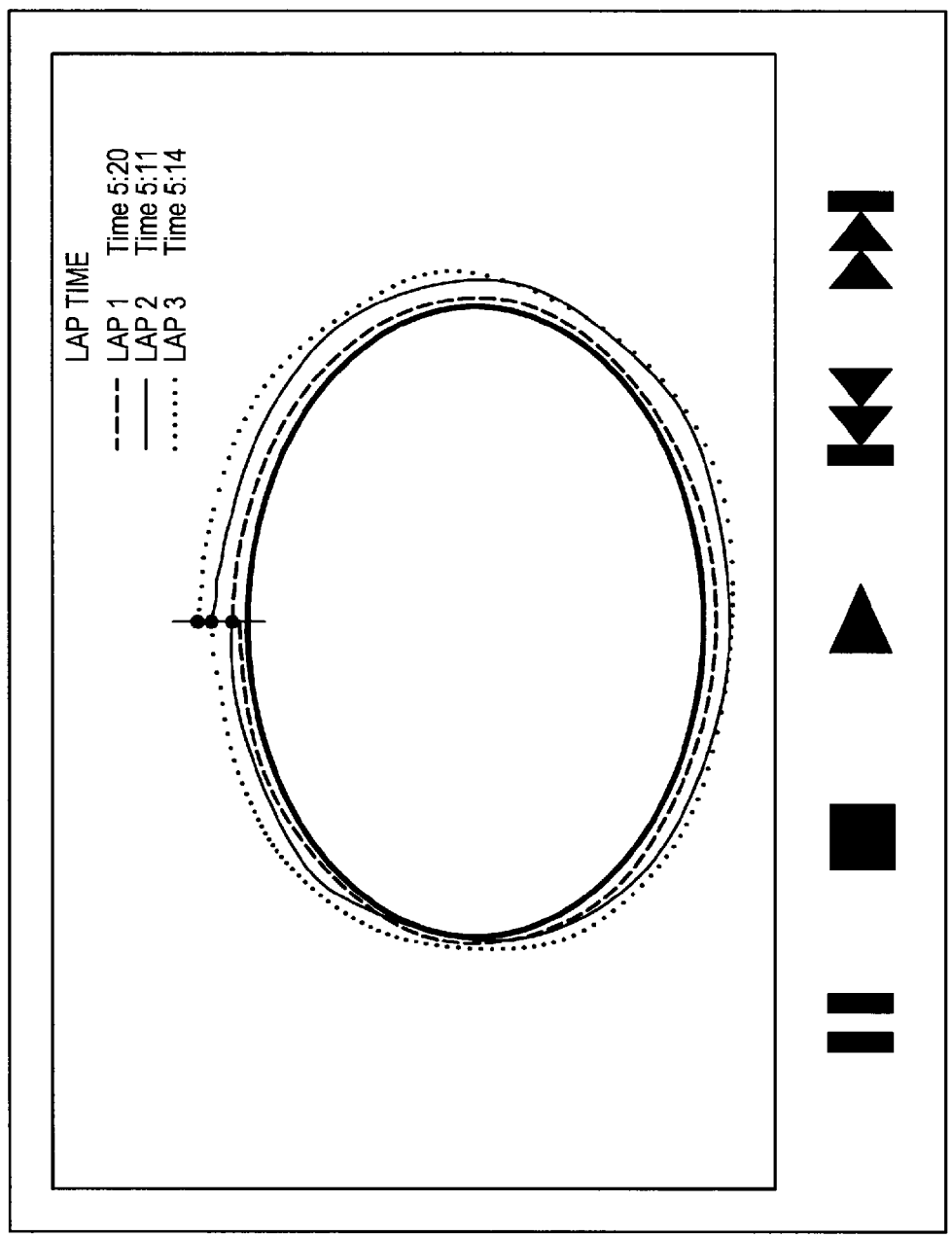
FIG. 26 is an explanatory diagram showing an example of the playback screen including the analysis information.

Next, with reference to FIGS. 24 to 26, analysis information related to provision of a movement trace will be described. FIGS. 24 to 26 are each an explanatory diagram showing an example of a playback screen including analysis information. The playback control section 170 can provide analysis information related to a track list being played by causing the display control section 172 to display the analysis information on a playback screen.

For example, the playback control section 170 may cause information related to a track displayed on the playback screen to be displayed on the playback screen. Referring to FIG. 24, there are displayed movement distance, time required for the movement, average speed, maximum speed, altitude difference, and calories burned of each track. Note that, although not shown, there may be displayed not only analysis data for each track, but also analysis data of the total of all tracks included in the track list. As for such an analysis data, there may be displayed data which is analyzed in advance and stored in association with data of movement trace track, or there may be displayed data which is analyzed at the time of playback.

Alternatively, the playback control section 170 may cause analysis data of a block specified in the playback screen to be displayed on the playback screen. For example, the block may be specified by performing frame-by-frame advance playback of an icon indicating a playback position and selecting the beginning and the end of the block. Alternatively, the block may be set based on a position specified by the operation section 104 such as a touch panel.

Further, as shown in FIG. 26, there may be displayed time per lap of orbiting movement. The analysis may be started when a measurement start position is explicitly shown, or the analysis may be performed by automatically detecting the orbiting movement from movement trace information.

3. Second Embodiment

Playback Device

Figure 27:
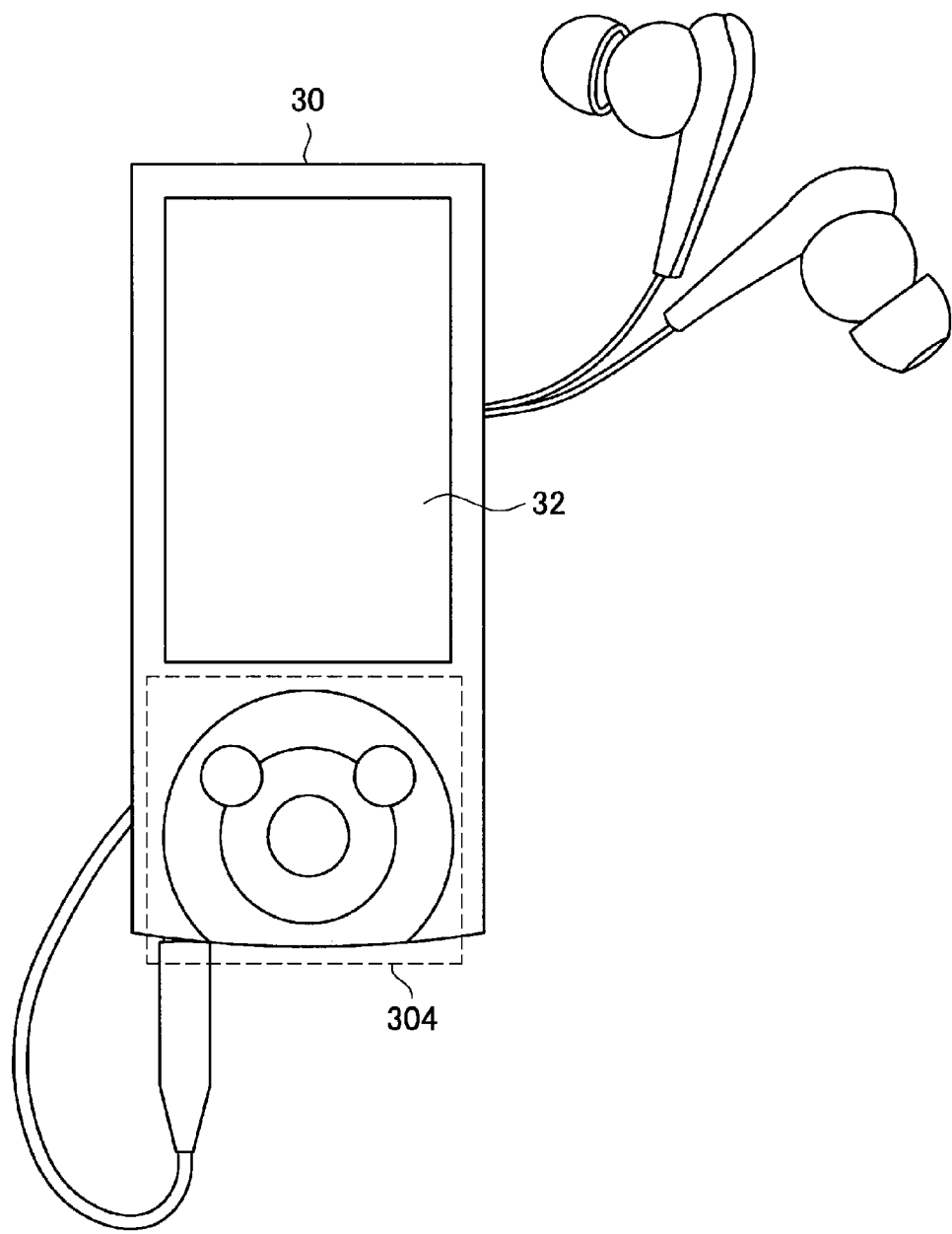
FIG. 27 is an explanatory diagram showing an example of an external appearance of a playback device.
Figure 28:
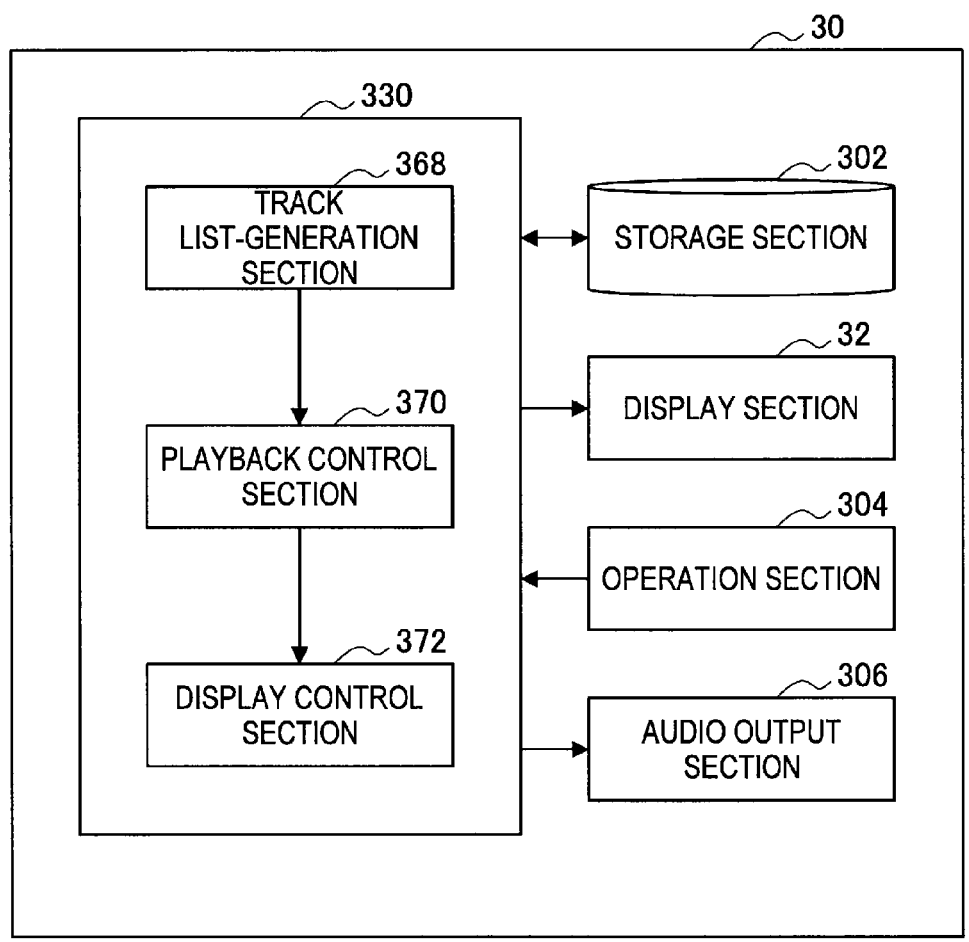
FIG. 28 is a block diagram showing a functional configuration of an information processing apparatus (playback device) according to a second embodiment.

Next, with reference to FIGS. 27 and 28, a playback device 30 according to a second embodiment of the present disclosure will be described. The playback device 30 is a portable playback device, and has an external appearance shown in FIG. 27. FIG. 27 is an explanatory diagram showing an example of an external appearance of a playback device. FIG. 28 is a block diagram showing a functional configuration of a playback device according to the second embodiment of the present disclosure.

The playback device 30 is an information processing apparatus having a music playback function and a movement history track playback function. Referring to FIG. 28, the playback device 30 mainly includes a storage section 302, a display section 32, an operation section 304, an audio output section 306, and a control section 330. The control section 330 mainly functions as a track list-generation section 368, a playback control section 370, and a display control section 372.

Compared with the PND 10 according to the first embodiment, the playback device 30 is different in that the playback device 30 does not have the movement history-acquisition function and the movement trace track-generation function. In this case, the playback device 30 may acquire a movement trace track or a content track from an information processing apparatus having the movement history-acquisition function and the movement trace track-generation function, and may play the movement trace track or the content track. In this case, the playback device 30 may acquire a track via a network such as the Internet, or may acquire a track via an external recording medium inserted into an interface (not shown). Further, a movement history-acquisition device and a movement trace track-generation device may be separate devices from each other.

The storage section 302, the display section 32, the operation section 304, and the audio output section 306 have the same functions as the functions of the storage section 102, the display section 12, the operation section 104, and the audio output section 106, respectively, and hence, detailed descriptions will be omitted here. Further, the track list-generation section 368, the playback control section 370, and the display control section 372 have the same functions as the functions of the track list-generation section 168, the playback control section 170, and the display control section 172, respectively. The user can perform operation related to the playback of the track list using the operation section 304, by the same operation as the operation at the time of playback of music.

In this way, the movement history-acquisition device and the movement trace track-generation device may be realized as separate devices from the playback device. The playback device is set to be a portable playback device here, but is not limited thereto. For example, in the case where the playback device does not have the function of acquiring movement history, it is not necessary that the playback device be a portable device. The playback function of the movement history track may be realized by a desktop PC or a fixed mount type audio player.

4. Third Embodiment

Imaging Device

Next, with reference to FIG. 29, an imaging device 50 which is an information processing apparatus according to a third embodiment of the present disclosure will be described. FIG. 29 is a functional block diagram of an imaging device which is an information processing apparatus according to the third embodiment.

The imaging device 50 is an information processing apparatus which has a movement history information-acquisition function and a playback function for playing a movement trace track, in addition to an imaging function. Referring to FIG. 29, the imaging device 50 mainly includes a GPS antenna 512, an imaging section 580, a control section 530, a communication section 592, a storage section 502, a display section 52, an operation section 504, and an audio output section 506.

The control section 530 mainly functions as the GPS processing section 532, the imaging signal processing section 582, the track acquisition section 590, the track list-generation section 568, the playback control section 570, and the display control section 572.

Of those, the functions of the storage section 502, the display section 52, the operation section 504, the audio output section 506, the GPS antenna 512, and the GPS processing section 532 are the same as the functions of the storage section 102, the display section 12, the operation section 104, the audio output section 106, the GPS antenna 112, and the GPS processing section 132 according to the first embodiment, respectively, and hence, descriptions will be omitted here.

The communication section 592 is a communication interface for the imaging device 50 to communicate with an external device. The communication section 592 has a function of communicating with an external server and the like in accordance with control of the control section 530.

The imaging device 50 has an imaging function, by a function of the imaging section 580 and the imaging signal processing section 582. The imaging section 580 has an optical system, an imaging element, a processing circuit, and the like. The optical system includes a lens element for focusing light from a subject and the like. Then, the imaging element is supplied with incident light entered via the optical system. The imaging element converts the light supplied via the optical system into an imaging signal and inputs the imaging signal into the processing circuit. Note that the imaging element may be, for example, a CCD (Charge Coupled Device) sensor and a CMOS (Complementary Metal Oxide Semiconductor) sensor. Further, the processing circuit performs various types of signal processing to an analogue imaging signal supplied by the imaging element. For example, the processing circuit performs sampling processing, noise removal processing, gain adjustment processing, and A/D conversion processing, and the imaging signal processing section 582 is supplied with a digital imaging signal.

The imaging signal processing section 582 has a function of performing various types of processing to the digital imaging signal supplied by the imaging section 580. For example, the imaging signal processing section 582 performs compression processing of the imaging signal, and stores digital image data in the storage section 502.

According to the configuration shown above, the imaging device 50 has the imaging function of acquiring an image and the function of acquiring movement trace information by acquiring position information. The track acquisition section 590 has a function of acquiring a track by transmitting the acquired movement trace information, the acquired image, and the like to a server on a cloud via the communication section 592. In the server on the cloud, the track generation processing as described in the first embodiment is performed. The track acquisition section 590 supplies the track list-generation section 568 with the acquired track. Alternatively, the processing performed in the track list-generation section 568 may also be performed in the server on the cloud.

It should be understood by those skilled in the art that various modifications, combinations, sub-combinations and alterations may occur depending on design requirements and other factors insofar as they are within the scope of the appended claims or the equivalents thereof.

For example, although a photograph or audio memo is used as the content in the above embodiments, the present disclosure is not limited to such an example. For example, the content may be a concept including music data such as music, a lecture, and a radio program, video data such as a film, a television program, a video program, a photograph, a document, a picture, and a chart, a game, and software.

Further, in the above embodiments, there have been described the following devices: in the first embodiment, the PND having the functions as the movement trace information-acquisition device, the generation device for generating a movement trace track from the movement trace information, and the playback device for playing the movement trace track; in the second embodiment, the playback device having the function of playing a movement trace track; and in the third embodiment, the imaging device having functions as the movement trace information-acquisition device and the playback device for playing a movement trace track. However, the embodiments are not limited thereto. The information processing apparatus may be a device having at least any one of the functions of the movement trace information-acquisition device, the generation device for generating a movement trace track from movement trace information, and the playback device for playing a movement trace track. Examples of the information processing apparatus include a mobile phone, a PHS (Personal Handyphone System), a portable music playback device, a portable video processing apparatus, a portable game device, a PC (Personal Computer), a video processing apparatus for home use (such as a DVD recorder and a video cassette recorder), a PDA (Personal Digital Assistants), a game device for home use, and a consumer electronics device.

That is, the PND and the playback device described in the first embodiment and the second embodiment, respectively, may each have an imaging function. Further, the PND and the imaging device described in the first embodiment and the third embodiment, respectively, each have the position information-acquisition function using a GPS, but are not limited thereto. There may be used every position information-acquisition functions such as a relative position-acquisition function using a sensor and a position-acquisition function using radio communication. Further, the function of acquiring position information is not limited to one function. The device may be provided with two or more position information-acquisition functions, and may generate more accurate position information from those pieces of information. Further, the PND and the playback device described in the first embodiment and the second embodiment, respectively, may each have a communication function.

Note that in the present specification, the steps written in the flowchart may of course be processed in chronological order in accordance with the stated order, but may not necessarily be processed in the chronological order, and may be processed individually or in a parallel manner. It is needless to say that, in the case of the steps processed in the chronological order, the order of the steps may be changed appropriately according to circumstances.

REFERENCE SIGNS LIST

10 PND (information processing apparatus)
12 Display section
102 Storage section
104 Operation section
106 Audio output section
110 Navigation function unit
112 GPS antenna
114 Z-axis gyro sensor
116 Y-axis gyro sensor
118 3-axis acceleration sensor
120 Geomagnetic sensor
122 Pressure sensor
130 Control section
132 GPS processing section
134 Angle calculation section
136 Position calculation section
138 Velocity calculation section
140 Attitude angle detection section
142 Azimuth calculation section
144 Altitude calculation section
150 Navigation section
162 Movement trace information-acquisition section
164 Division point-determination section
166 Track generation section
168 Track list-generation section
170 Playback control section
172 Display control section

The invention claimed is:

1. An information processing apparatus comprising:
a non-transitory computer readable medium that has movement trace information stored therein; and
a computer processing unit that automatically divides the movement trace information at a division point into a first movement trace segment and a second movement trace segment, wherein
the computer processing unit automatically determines the division point based on content data associated with the movement trace information, and
the computer processing unit adds a content data segment, for the content data, in between the first movement trace segment and the second movement trace segment, and the computer processing unit is configured to generate a movement trace track from the movement trace information; and an interface through which the computer processing unit outputs a display signal that causes a display device to display the movement trace track that includes the first movement trace segment, the second movement trace segment, a visual indication of the division point and the content data segment, wherein the movement trace track is represented by a bar having a length according to a movement time.

2. The apparatus of claim 1, wherein
the computer processing unit automatically determines an additional division point based on position information of a stay part.

3. The apparatus of claim 2, wherein
said stay part includes a plurality of stay positions within a predetermined geographic area over a predetermined time period.

4. The apparatus of claim 3, wherein
one of the plurality of stay positions is set when position information of a movement trace track is continuously contained within the predetermined area for an hour or more.

5. The apparatus of claim 1, wherein
the computer processing unit automatically determines an additional division point based on altitude information.

6. The apparatus of claim 5, wherein
the altitude information includes time-series altitude changes of the movement trace information, and
the computer processing unit determines an additional division point at a peak altitude within a predetermined time period.

7. The apparatus of claim 6, wherein
the computer processing unit does not set the additional division point at the peak altitude when inclination angle information is less than a predetermined threshold.

8. The apparatus of claim 1, wherein
the computer processing unit automatically determines an additional division point based on detection of an orbiting movement in the movement trace information.

9. The apparatus of claim 1, wherein
the computer processing unit automatically determines an additional division point based on a change in transportation mode.

10. The apparatus of claim 9, wherein
the computer processing unit detects a change in speed of the movement trace information, and
determines that the transportation mode has changed when the change in speed is above a predetermined level.

11. The apparatus of claim 1, wherein
the content data is associated in time with a position in the movement trace information.

12. The apparatus of claim 1, wherein
the content data includes at least one of a photograph, a video recording, and an audio recording.

13. The apparatus of claim 1, wherein
the computer processing unit automatically determines an additional division point based on a lapse of position data.

14. The apparatus of claim 1, wherein
the computer processing unit automatically determines an additional division point based on at least one of time of day and day of week.

15. The apparatus of claim 1, wherein
the computer processing unit automatically determines an additional division point based on predefined user settable track segments.

16. The apparatus of claim 1, wherein
the first movement trace segment and the second movement trace segment are each a segment that does not include the content data.

17. The apparatus of claim 1, wherein
the content data segment is a segment that does not include the movement trace information.

18. An information processing method comprising:
retrieving, from a non-transitory computer readable medium, movement trace information;
automatically dividing, with a computer processing unit, the movement trace information at a division point, based on content data associated with the movement trace information, into a first movement trace segment and a second movement trace segment; and
adding, with the computer processing unit, a content data segment, for the content data, in between the first movement trace segment and the second movement trace segment, generating, with the computer processing unit, a movement trace track from the movement trace information, displaying, on a display device, the movement trace track that includes the first movement trace segment, the second movement trace segment, a visual indication of the division point and the content data segment, wherein the movement trace track is represented by a bar having a length according to a movement time.

19. A non-transitory computer readable storage device having instructions that when executed by a computer processing unit performs an information processing method comprising:

retrieving, from the non-transitory computer readable medium, movement trace information;

automatically dividing, with the computer processing unit, the movement trace information into a first movement trace segment and a second movement trace segment at a division point based on content data associated with the movement trace information; and adding, with the computer processing unit, a content data segment, for the content data, in between the first movement trace segment and the second movement trace segment, generating, with the computer processing unit, a movement trace track from the movement trace information, displaying, on a display device, the movement trace track that includes the first movement trace segment, the second movement trace segment, a visual indication of the division point and the content data segment, wherein the movement trace track is represented by a bar having a length according to a movement time.

20. The apparatus of claim 16, wherein the content data segment is a segment that does not include the movement trace information.

* * * * *